(12) United States Patent
Uchida

(10) Patent No.: US 7,511,735 B2
(45) Date of Patent: Mar. 31, 2009

(54) IMAGE-TAKING APPARATUS CORRECTING IMAGE-TAKING PARAMETER DURING NORMAL IMAGE-TAKING BASED ON CORRECTION AMOUNT SET IN CALIBRATION MODE

(75) Inventor: Takayuki Uchida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 850 days.

(21) Appl. No.: 10/951,168

(22) Filed: Sep. 27, 2004

(65) Prior Publication Data

US 2005/0068428 A1  Mar. 31, 2005

(30) Foreign Application Priority Data

Sep. 29, 2003  (JP)  ............... 2003-337071

(51) Int. Cl.
H04N 17/00  (2006.01)
(52) U.S. Cl. ..................................... 348/187
(58) Field of Classification Search ........................ None
See application file for complete search history.

(56) References Cited

U.S. PATENT DOCUMENTS

| 6,954,233 | B1* | 10/2005 | Ito ............................. 348/350 |
| 7,046,275 | B1* | 5/2006 | Yamada et al. ........... 348/220.1 |
| 7,110,032 | B2* | 9/2006 | Furukawa ............... 348/333.02 |
| 2003/0234876 | A1* | 12/2003 | Bloom et al. ............. 348/231.3 |
| 2004/0017594 | A1* | 1/2004 | Suekane et al. ............. 358/516 |

FOREIGN PATENT DOCUMENTS

| JP | 2000-292684 | | 10/2000 |
| JP | 2001-257933 | | 9/2001 |
| JP | 2001285779 A | * | 10/2001 |
| JP | 2002051250 A | * | 2/2002 |
| JP | 2002232751 A | * | 8/2002 |

\* cited by examiner

Primary Examiner—Justin P Misleh
(74) Attorney, Agent, or Firm—Cowan, Liebowitz & Latman, P.C.

(57) ABSTRACT

An image-taking apparatus, which can automatically adjust parameters relating to image-taking regardless of variations in manufacturing errors and adjustment errors, is disclosed. The image-taking apparatus takes images by using an image pickup element. The image-taking apparatus successively shifts a parameter relating to image-taking so as to include a reference value, and takes a plurality of images with the parameters different from each other. Furthermore, the image-taking apparatus stores information on the parameter corresponding to an image selected by a user among the plurality of images in a memory, and determined the parameter to be used for image-taking on the basis of information stored in the memory.

5 Claims, 24 Drawing Sheets

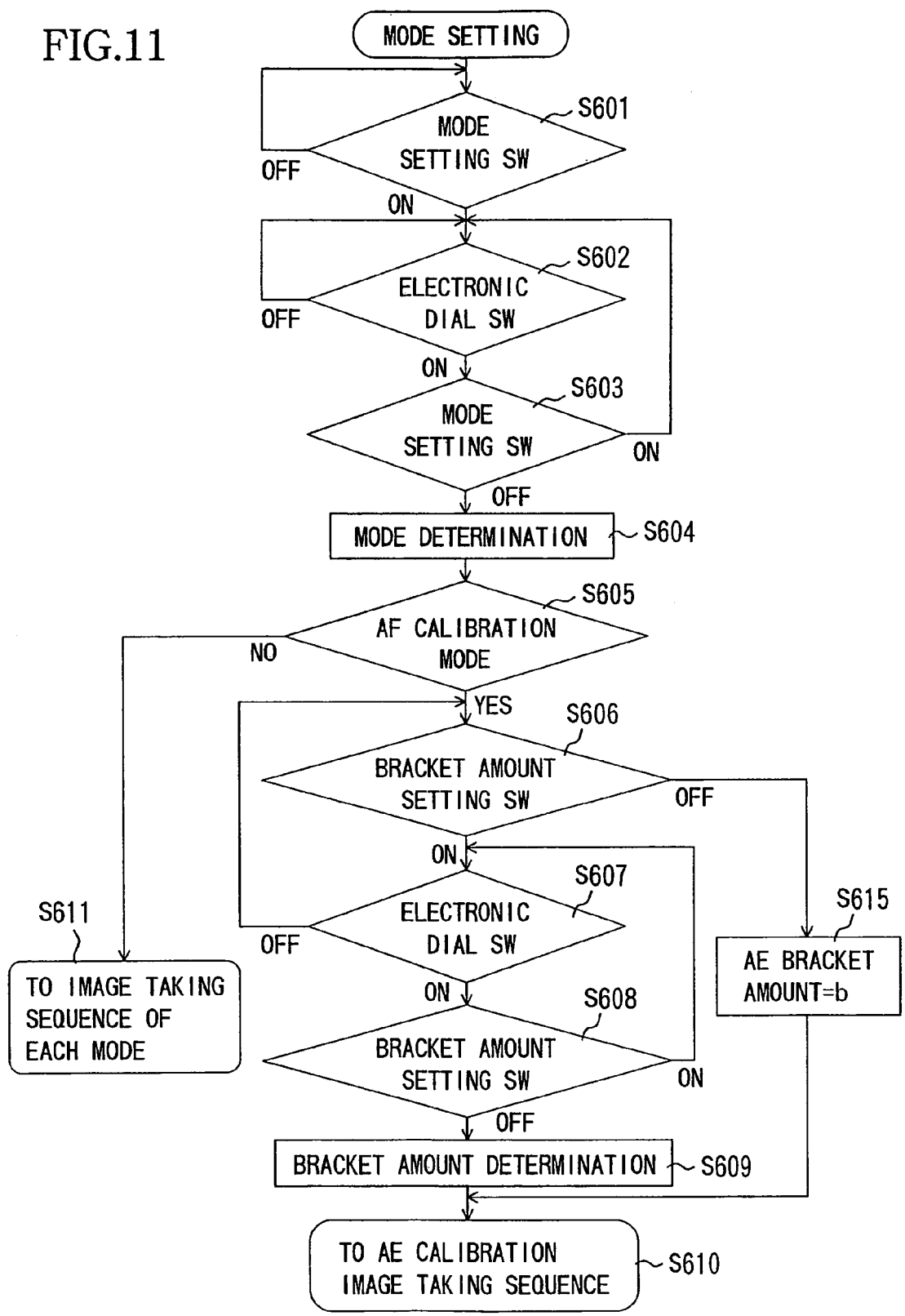

IMAGE-TAKING APPARATUS CORRECTING IMAGE-TAKING PARAMETER DURING NORMAL IMAGE-TAKING BASED ON CORRECTION AMOUNT SET IN CALIBRATION MODE

BACKGROUND OF THE INVENTION

1. Field of the Invention

The present invention relates to an image-taking apparatus having functions that automatically adjust parameters relating to image-taking (image acquiring).

2. Description of Related Art

Conventionally, the following functions that automatically adjust parameters relating to image-taking so as to take an excellent image are provided.

The autofocusing function automatically carries out focusing from a lens or a distance as a reference. In focusing, an error at a level that does not pose a problem in actual image-taking is allowed.

Furthermore, the auto exposure function is provided which automatically sets an amount of exposure for an image pickup element. Furthermore, the auto white balance adjusting function is also provided which automatically determines the color temperature of an acquired image and automatically adjusts the white balance.

Herein, regarding the focusing of the autofocusing function, in particular, in the case of a single lens reflex camera system, both the camera main body and image-taking lens have errors in manufacturing, for example, errors in the positions to which a focusing lens is driven in actuality in response to an input position instruction signal, or errors in the adjusted values, for example, errors in values for correction of a deviation between the results of calculation of the focusing lens position on the basis of the results of focus detection and the focusing lens position in the truly in-focus state. Therefore, in autofocusing in a case of a combination of a single lens reflex camera and an image-taking lens, a focus error exceeding the allowance value occurs.

Furthermore, in the auto exposure function, due to errors in the attaching position of a photometry element, adjusting errors in the auto exposure itself, and furthermore, due to errors caused by the combination with an image-taking lenses and differences in a user's preference, a difference appears between the auto exposure level set before shipment and the exposure level intended by a user. Furthermore, even in the auto white balance adjusting function, there is a gap between the color tone preferred by a user and the color tone automatically adjusted (corrected) by the camera.

Therefore, in Japanese Patent Application Laid-Open No. 2000-292684, a technique that solves the problem relating to the autofocusing function is proposed. In this technique, the position of the focusing lens calculated by a phase difference detection method is regarded as a first focus detection result, and a change in contrast of an image is detected while moving the focusing lens in a phased manner according to TV-AF or a method called a hill-climbing. AF, and a lens position where the contrast becomes highest is regarded as a second focus detection result. Then, the difference between the first and second focus detection results is stored as a correction value of autofocusing. During actual image-taking, the phase difference detection method and the abovementioned stored correction value are used to carry out autofocusing. Thereby, autofocusing with high accuracy can be carried out.

In addition, in Japanese Patent Application Laid-Open No. 2001-257933, as a technique that copes with differences in a user's preference with respect to the auto exposure function and the auto white balance adjusting function, a technique is proposed in which values obtained by correcting automatic functions by a user when taking images are defined as custom set values, and a plurality of combinations of these are stored in the camera. Thereby, the user can select custom set values corresponding to user's preference in the next image-taking.

However, in the technique proposed in Japanese Patent Application Laid-Open No. 2000-292684, focus detection must be carried out by a method (contrast detection method) other than the focus detection method used for actual image-taking. Calculation and control of the lens in the contrast detection method is extremely complicated, so that the capacity of the necessary calculation program and the lens control program becomes large. Therefore, the capacity of the memory that stores the programs must be increased or the capacity of the operation programs used for normal image-taking must be limited. Furthermore, electrical circuitry (low pass filter, etc., for extracting high frequency components from the output of the image pickup element) according to the contract detection method also becomes necessary.

Furthermore, the technique proposed in Japanese Patent Application Laid-Open No. 2001-257933 enables image acquiring adapted to a user's preference, however, it does not serve as a function that automatically corrects variations in manufacturing errors in each of the camera and the image-taking lens, and errors caused by the combination of the camera and the lens.

SUMMARY OF THE INVENTION

An object of the invention is to provide an image-taking apparatus which can automatically adjust parameters (focus and exposure value, etc.,) relating to image-taking regardless of variations in manufacturing errors and adjusting errors while minimizing circuitry and the program loading amount which are unnecessary for normal image-taking.

According to one aspect of the invention, an image-taking apparatus comprises an image pickup element which photoelectrically converts an object image and an image-taking section which carries out image-taking by using the image pickup element. Furthermore, the image pickup element comprises a first control section which successively shifts a parameter relating to image-taking so as to include a reference value, and makes the image-taking section take a plurality of images with the parameters different from each other, and a second control section which stores information on the parameter corresponding to an image selected by a user among the plurality of images in a memory. The image-taking apparatus further comprises a third control section which determines the parameter to be used for image-taking (image-taking after taking the plurality of images) on the basis of information stored in the memory.

Another aspect of the invention relates to a processing program to be executed by an image-taking apparatus having an image pickup element which photoelectrically converts an object image. The processing program comprises a first step, a second step, and a third step. In the first step, a parameter relating to image-taking is successively shifted so as to include a reference value and a plurality of images with parameters different from each other are taken on the basis of the output signals of the image pickup element. In the second step, information on the parameter corresponding to an image selected by a user among the plurality of images is stored in a memory. Furthermore, in the third step, on the basis of the information stored in the memory, the parameter to be used for image-taking (image-taking after taking the above-described plurality of images) is determined.

Characteristics of the image-taking apparatus and the processing program of the invention will become clearer due to the following detailed description of embodiments with reference to the drawings.

BRIEF DESCRIPTION OF THE DRAWINGS

FIG. 11 shows a flowchart of a mode setting sequence to be performed in the electronic camera of Embodiment 2.

DETAILED DESCRIPTION OF THE PREFERRED EMBODIMENTS

Hereinafter, embodiments of the invention are described with reference to the drawings. In the following embodiments, as "a parameter relating to image-taking", an amount of defocus of the image-taking optical system that forms an object image, an exposure value of the image pickup element, and a color temperature are used, and other parameters can also be used. Herein, a reference value of the amount of defocus is an amount of defocus corresponding to an in-focus state in the focusing control of the image-taking optical system, a reference value of the exposure value is determined according to the results of photometry of an object in the exposure value control and a reference value of the color temperature is a color temperature that becomes a reference for white balance control.

Embodiment 1

Embodiment 1 of the invention is described with reference to FIG. 1 through FIGS. 9A and 9B.

Figure 1:
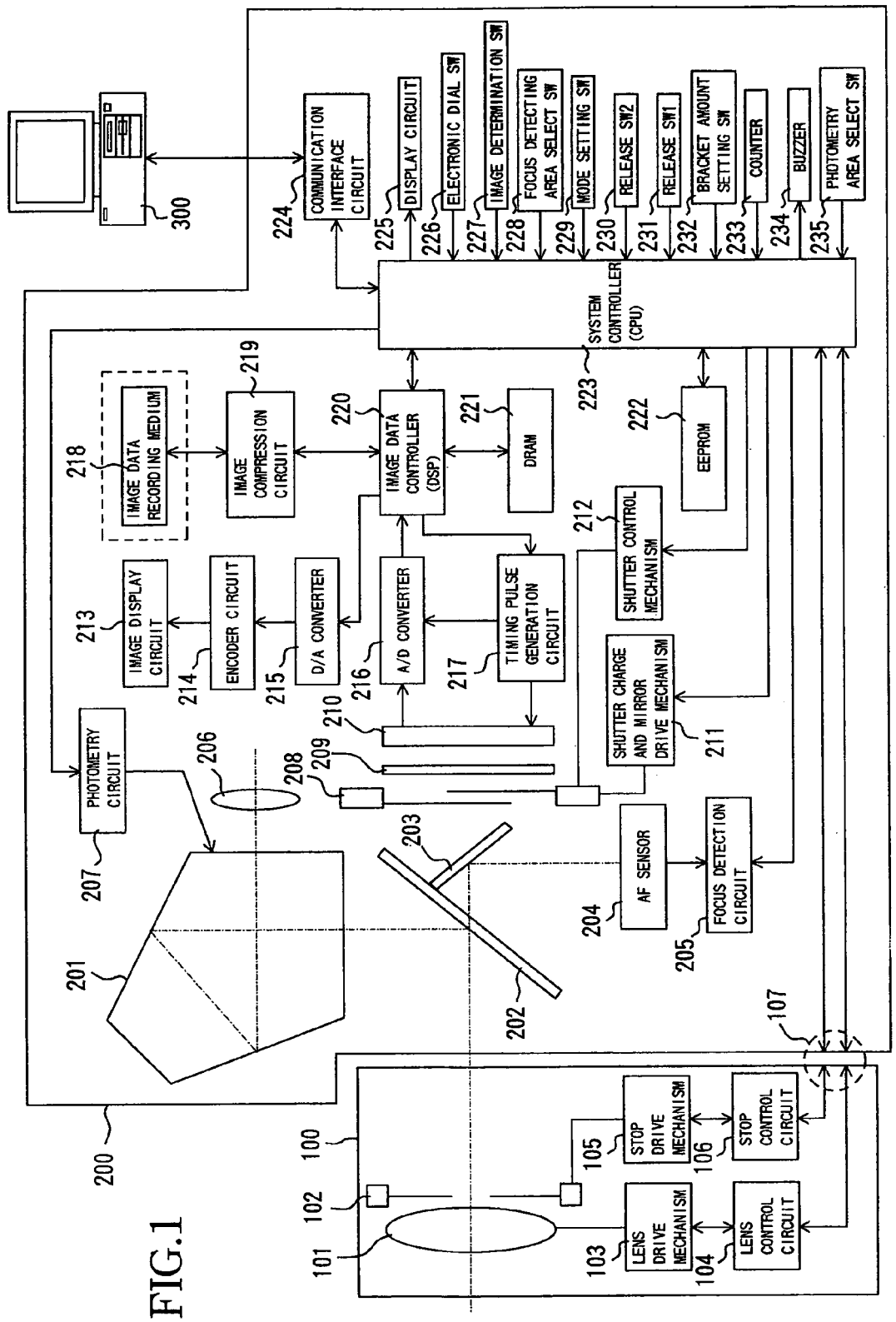
FIG. 1 shows a block diagram of an electronic camera of Embodiment 1 of the invention.

As shown in FIG. 1, to an electronic camera (image-taking apparatus) 200 of this embodiment, an image-taking lens 100 is detachably attached via a lens attachment mechanism of a mounting portion that is not shown. At the mounting portion, an electrical contact unit 107 is provided. The electronic camera 200 communicates with the image-taking lens 100 through the electrical contact unit 107 to control the driving of a focusing lens 101 and a stop 102 that adjusts the amount of light inside the image-taking lens 100. In FIG. 1, only the focusing lens 101 is shown as a lens inside the image-taking lens 101, however, a zooming lens or a fixed lens may be provided instead.

A light flux from an object that is not shown is guided to a quick return mirror 202 inside the electronic camera 200 via the lens unit 101 and the stop 102 inside the image-taking lens 100. The quick return mirror 202 is disposed diagonally to the optical axis within an image-taking optical path, and is movable between a first position (position shown in FIG. 1) where the quick return mirror 202 guides the light flux from the object to the finder optical system at the upper side, and a second position withdrawn to the outside of the image-taking optical path.

Figure 6:
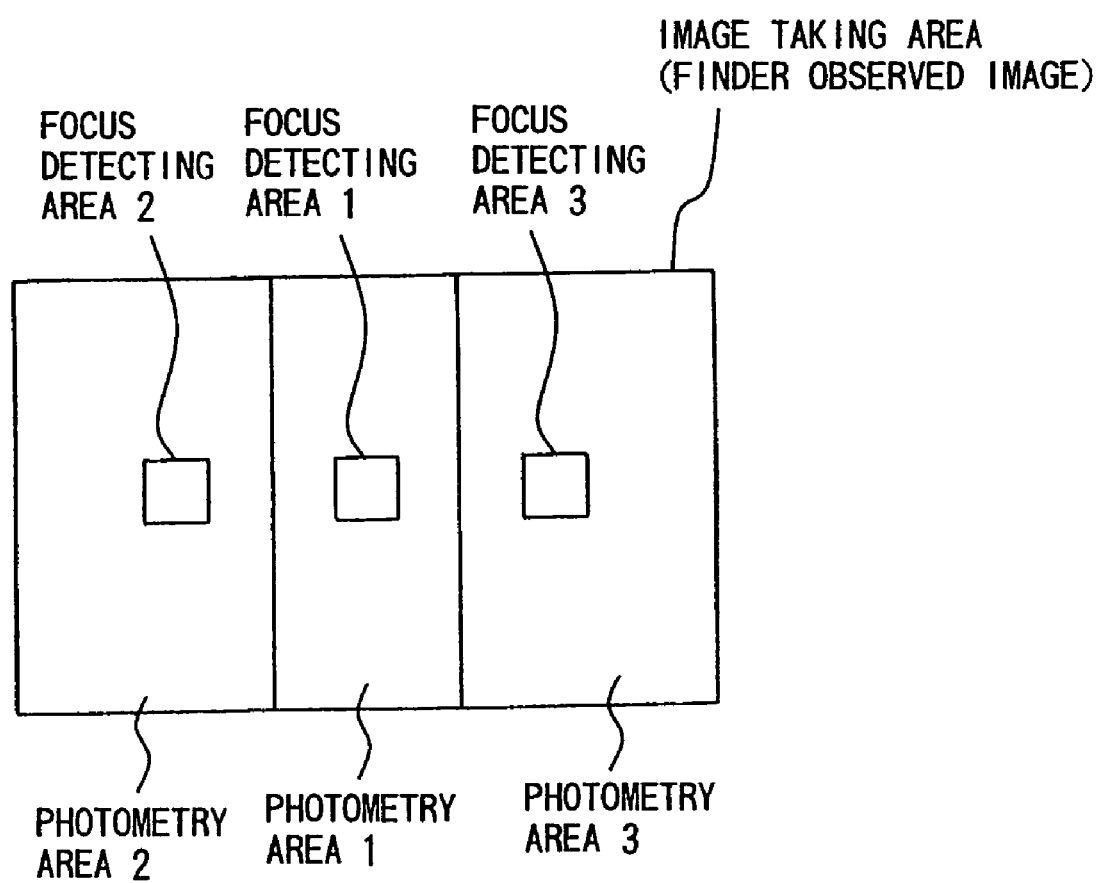
FIG. 6 shows an explanatory view of the relationship of a finder observation image, a focus detecting area, and a photometry area.

The center portion of the quick return mirror 202 is formed as a half mirror, and when the quick return mirror 202 lowers to the first position, a part of the light flux from the object transmits the half mirror portion. This light flux that has transmitted is reflected by a sub mirror 203 provided on the back surface side of the quick return mirror 202, and guided to an AF sensor 204 that forms an auto-focusing unit in conjunction with a focus detection circuit 205. The focus detection circuit 205 detects the focus state (performs focus detection) of the image-taking lens 100 by using the AF sensor 204 in a focus detecting area selected by a user or a system controller described later among a plurality of areas (focus detecting areas) 1 through 3 in an image-taking area as shown in FIG. 6.

On the other hand, the light flux reflected by the quick return mirror 202 reaches the eye of a photographer via a finder optical system comprising a pentaprism 201 and an ocular lens 206.

Furthermore, when the quick return mirror 202 rises to the second position, the light flux from the image-taking lens 101 reaches the image pickup element 210 via a focal plane shutter 208 serving as a mechanical shutter and an optical filter 209. The image pickup element 210 is an image sensor represented by a CCD sensor or a CMOS sensor, etc. The optical filter 209 has a function that guides only visible light to the image pickup element 210 by cutting infrared rays, and a function as an optical lowpass filter.

Furthermore, the focal plane shutter 208 has a front curtain and a rear curtain, and controls transmitting and blocking of the light flux from the image-taking lens 100.

When the quick return mirror 202 rises to the second position, the sub mirror 203 is accordingly folded to the quick return mirror 202 and withdrawn to the outside of the image-taking optical path.

The electronic camera 200 of this embodiment has a system controller 223 which controls the operation of the electronic camera 200. The system controller 223 consists of a CPU or an MPU, etc., and controls operations of circuits, etc., described later.

The system controller 223 communicates with a lens control circuit 104 and a stop control circuit 106 inside the image-taking lens 100 via the electrical contact unit 107. The lens control circuit 104 controls a lens drive mechanism 103, which drives the focusing lens 101 in the optical axis direction to carry out focusing, in response to signals from the system controller 223. The lens drive mechanism 103 has a stepping motor as a drive source.

The stop control circuit 106 controls a stop drive mechanism 105, which drives the stop 102, in response to signals from the system controller 223.

The system controller 223 is connected to a shutter control circuit 212 and a photometry circuit 207 also. The shutter control circuit 212 controls a shutter charge and mirror drive mechanism 211, which drives the quick return mirror 202 to rise and lower and drives the focal plane shutter 208 to charge, and controls the runnings of the front curtain and the rear curtain of the focal plane shutter 208, in response to signals from the system controller 223.

Furthermore, to the system controller 223, an EEPROM (memory) 222 is also connected which stores parameters that require adjustment for controlling the electronic camera 200, camera ID (identification) information that is unique information for identification of the electronic camera individual, and adjusted values of parameters relating to image-taking adjusted by using a reference lens (image-taking lens used for adjustment of the electronic camera at the factory). The EEPROM 222 also stores values (calibration data) selected by a user of the parameters relating to image-taking described later.

The system controller 223 functions as a first control section that controls the AF, AE, and white balance bracket image-taking (image-takings with stepping exposure), a second control section which stores the parameters relating to image-taking selected by a user from the results of bracket image-taking, and a third control section which determines a parameter relating to image-taking to be used for normal image-taking.

The photometry circuit 207 is connected to a photometry sensor (not shown) disposed near the ocular lens 206, and measures the luminance of an object through the photometry sensor. The results of measurement by the photometry circuit 207 are transmitted to the system controller 223.

Herein, the photometry sensor is divided so that it can carry out photometry in a plurality of photometry areas 1 through 3 within the image-taking area as shown in FIG. 6. Furthermore, the photometry areas 1 through 3 correspond to focus detecting areas 1 through 3, respectively.

The system controller 223 controls the lens drive mechanism 103 to form an object image on the image sensor 210. Furthermore, the system controller 223 controls the stop drive mechanism 105 on the basis of a set Av value, and outputs a control signal to the shutter control circuit 212 on the basis of the set Tv value.

The front curtain and the rear curtain of the focal plane shutter 208 have a drive source formed of springs, so that it is necessary to charge the springs for the next movement after shutter running. The shutter charge and mirror drive mechanism 211 controls this spring charging. By the shutter charge and mirror drive mechanism 211, the quick return mirror 202 is driven to rise and lower.

To the system controller 223, an image data controller 220 is connected. The image data controller 220 serves as a correction data sample circuit and a correction circuit formed by a DSP (Digital Signal Processor), which controls the image pickup element 210, corrects and processes image data input from the image pickup element 210 on the basis of instructions from the system controller 223. The items with respect to the correction and processing of the image data also include auto white balance.

The auto white balance is a function which corrects a portion with a maximum luminance in a taken image to a predetermined color (white color). In the auto white balance, the correction amount can be changed in response to a command from the system controller 223.

To the image data controller 220, a timing pulse generating circuit 217, an A/D converter 216, a DRAM 221, a D/A converter 215, and an image compression circuit 219 are connected. The image data controller 220 through image compression circuit 219 described above form an image-taking section.

The timing pulse generating circuit 217 outputs pulse signals necessary for driving the image pickup element 210. The A/D converter 216 receives the timing pulses generated at the timing pulse generating circuit 217 in conjunction with the image pickup element 210 and converts analog signals corresponding to the object image output from the image pickup element 210 into digital signals. The DRAM 221 temporarily stores the obtained image data, that is, image data as digital data before being processed and data-converted into a predetermined format.

To the D/A converter 215, an image display circuit 213 is connected via an encoder circuit 214. Furthermore, to the image compression circuit 219, an image data recording media 218 is connected.

The image display circuit 213 is a circuit for displaying the image data taken by using the image pickup element 210, and is generally formed by a color liquid crystal display device.

The image data on the DRAM 221 read out by the image data controller 220 is converted into analog signals by the D/A converter 215 and is output to the encoder circuit 31. The encoder circuit 214 converts the output of the D/A converter 215 into video signals (for example, NTSC signals and PAL signals) necessary for driving the image display circuit 213.

The image compression circuit 219 is a circuit for compressing and converting the image data stored in the DRAM 221 (into, for example, JPEG data). The converted image data is stored in the image data recording media 218. As the recording media 218, a hard disk, a semiconductor memory, a magnetic disk or the like is used.

Furthermore, to the system controller 223, an operation indication circuit 225, a release switch SW1 (231), a release switch SW2 (230), a mode setting switch 229, a focus detecting area select switch 228, an image determination switch 227, a bracket amount setting switch 232, a photometry area select switch 235, an electronic dial switch 226, a counter 233, and a buzzer 234 are connected.

The operation indication circuit 213 indicates the operation state of the camera set or selected by the abovementioned respective switches on a liquid crystal device.

The release switch SW1 (231) is a switch for starting an image-taking preparation operation such as photometry and focusing. The release switch SW2 (230) is a switch for starting image-taking operations (charge accumulation and charge reading-out for acquiring a still image).

The mode setting switch 229 is a switch for setting a mode for making the electronic camera 200 execute a user's desired operation. The focus detecting area select switch 228 is a switch for selecting a focus detecting area for focus detection from the plurality of focus detecting areas described above.

The image determination switch (second selection section) 227 is a switch for selecting one of the plurality of images obtained through bracket image-taking described later. The bracket amount setting switch (first selection section) 232 is a switch for setting a bracket stepping amount (predetermined amount) that is an amount of change in the parameter in the bracket image-taking.

The photometry area select switch 235 is a switch for selecting a photometry area in which photometry is carried out among the plurality of focus detecting areas described above. The electronic dial switch 226 raises or lowers a parameter relating to image-taking according to the rotating operation thereof, and indicates this.

The counter 233 is a counter for counting the number of times of releasing during various bracket image-taking. The count number of the counter 233 is reset by the system controller 233.

The buzzer 234 produces sounds corresponding to various operations or beep sounds.

On the other hand, in the image-taking lens 100, the lens control circuit 104 is provided with a memory (not shown) that stores performance information including the focal length and the open aperture value, etc., of the image-taking lens 100, lens ID (identification) information that is unique information for identification of the image-taking lens 100, and information received from the system controller 223 by communications. The performance information and the ID information are transmitted to the system controller 223 by initial communications when the image-taking lens 100 is attached to the electronic camera 200, and the system controller 223 stores these pieces of information in the EEPROM 222.

The electronic camera 200 is provided with a communications interface circuit 224 for connection of an external connected apparatus 300 such as a personal computer. The system controller 223 can communicate with the external connected apparatus 300 through the communications interface circuit 224.

Next, the principle for detecting the amount of defocus (focus displacement amount) of the image-taking lens 100 is described with reference to FIG. 7 and FIG. 8.

Figure 7:
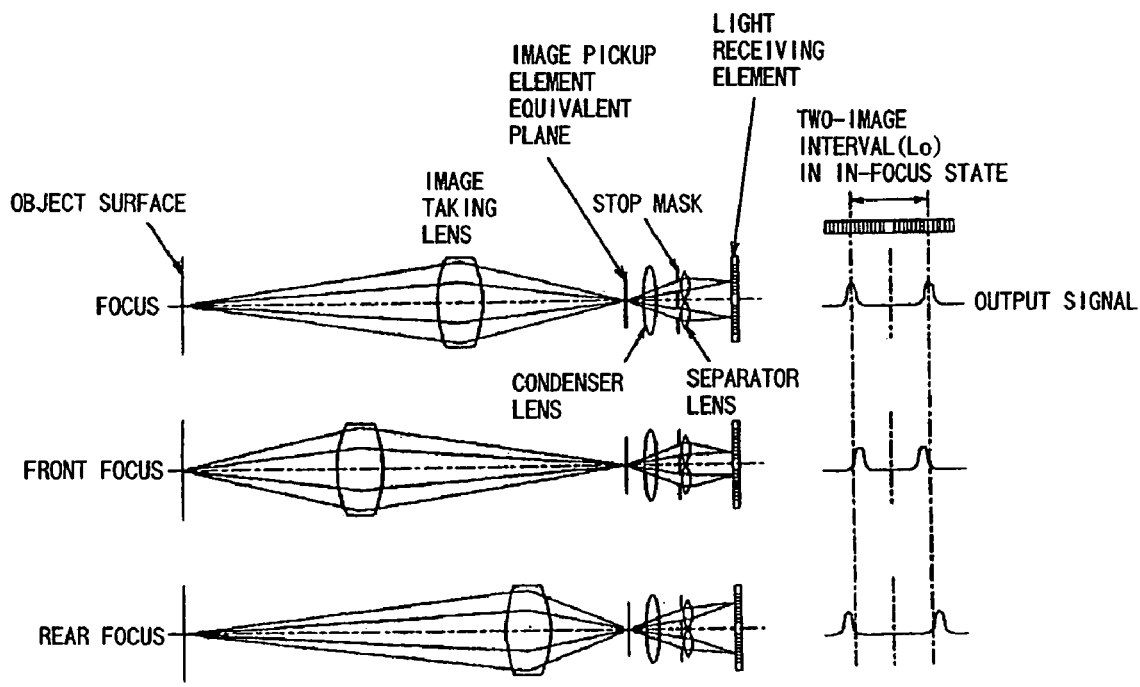
FIG. 7 shows a principle explanatory view of detection of an amount of defocus.
Figure 8:
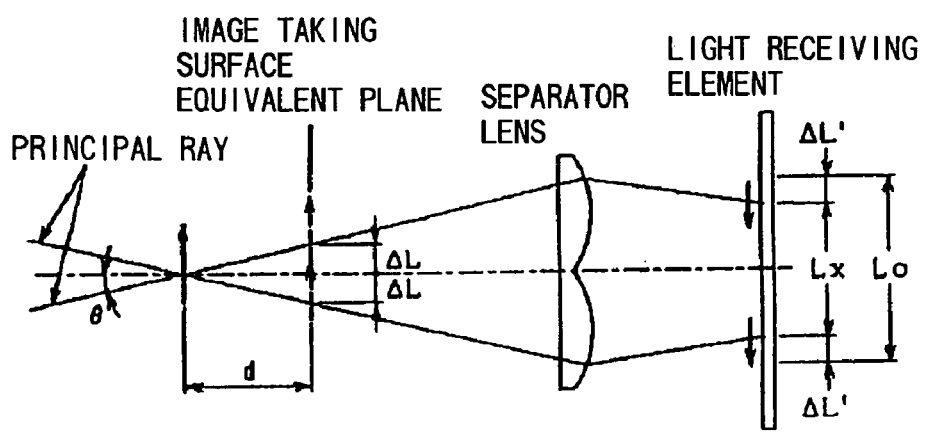
FIG. 8 shows a principle explanatory view of detection of an amount of defocus.

As shown in FIGS. 7 and 8, in a condition of focusing on the image pickup element, the interval between two images on a pair of light receiving elements (line sensors) as AF sensor 204 takes a certain value. This value can be calculated on designing, however, in actuality, the value does not become equal to the designed value due to the parts dimensions, variations, and assembling errors. Therefore, it is difficult to obtain the interval between the two images (reference two-image interval Lo) unless it is actually measured. As seen in FIG. 7, if the two-image interval is narrower than the reference two-image interval Lo, the image-taking lens is in a so-called front focus state, and if it is broader than Lo, the image-taking lens is in a so-called rear focus state.

FIG. 8 shows a model in which a condenser lens is omitted from the AF sensor 204. As shown in FIG. 8, when the angle of a principal ray entering the AF sensor 204 is represented as θ, the magnification of the separator lens is represented as β, and the image moving amounts are represented as ΔL and ΔL', the amount of defocus L is determined by the following expression.

$$d = \Delta L / \tan \theta = \Delta L' / \beta \tan \theta$$

Herein, β tan θ represents a parameter to be determined in design of the AF sensor 204. ΔL' can be determined from the reference two-image interval (Lo) and the current two-image interval (Lt).

The AF sensor 204 has a plurality of structures described above so as to carry out focus detection in the plurality of focus detecting areas within the image-taking area.

In adjustment of the autofocus control function at the time of manufacturing (before shipment from the factory), a reference lens whose focal position is known in advance is used, and the value of the two-image interval obtained from the AF sensor 204 is stored in the EEPROM 222 as an adjusted value of the AF focus correcting parameter (parameter relating to image-taking) so that the focal position comes to the position of the imaging surface of the image pickup element 210.

However, when the image-taking lens to be attached to the electronic camera is changed, the focal position varies due to manufacturing errors of the image-taking lens itself. Therefore, as described later, it is meaningful to make it possible for a user to select the AF focus correcting parameter.

Figure 2:
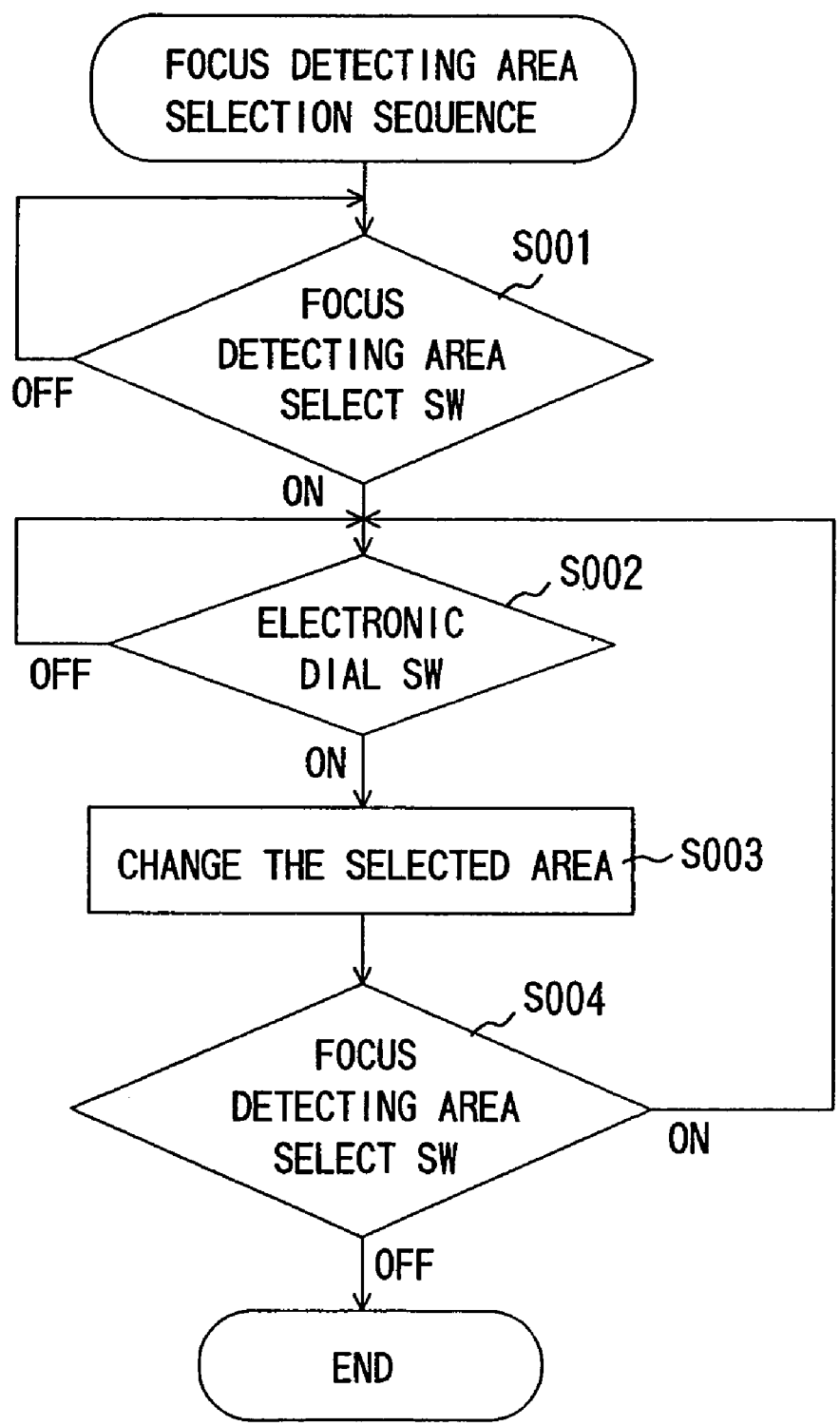
FIG. 2 shows a flowchart of a focus detecting area selection sequence to be performed in the electronic camera of Embodiment 1.

The focus detecting area selection sequence is described with reference to FIG. 2. This sequence is executed by the system controller 223 according to a program. The same applies to execution of the respective sequences described later.

First, in Step S001, the system controller 223 determines whether or not the focus detecting area select switch 228 has been turned ON. When it is ON, the process advances to Step S002.

In Step S002, it is determined whether or not the electronic dial switch 226 has been operated, and when it is operated, the direction and amount of operation is detected.

In Step S003, according to the direction and amount of operation of the electronic dial switch 226 detected in Step S002, the focus detecting area is changed. The focus detecting area to be selected is switched cyclically in sequence of all, focus detecting area 1, focus detecting area 2, focus detecting area 3, and all.

In Step S004, it is determined whether or not the photometry area select switch 235 has been turned ON again. When it is ON, the process returns to Step S002, and when it is not ON, this flow is ended.

Figure 3:
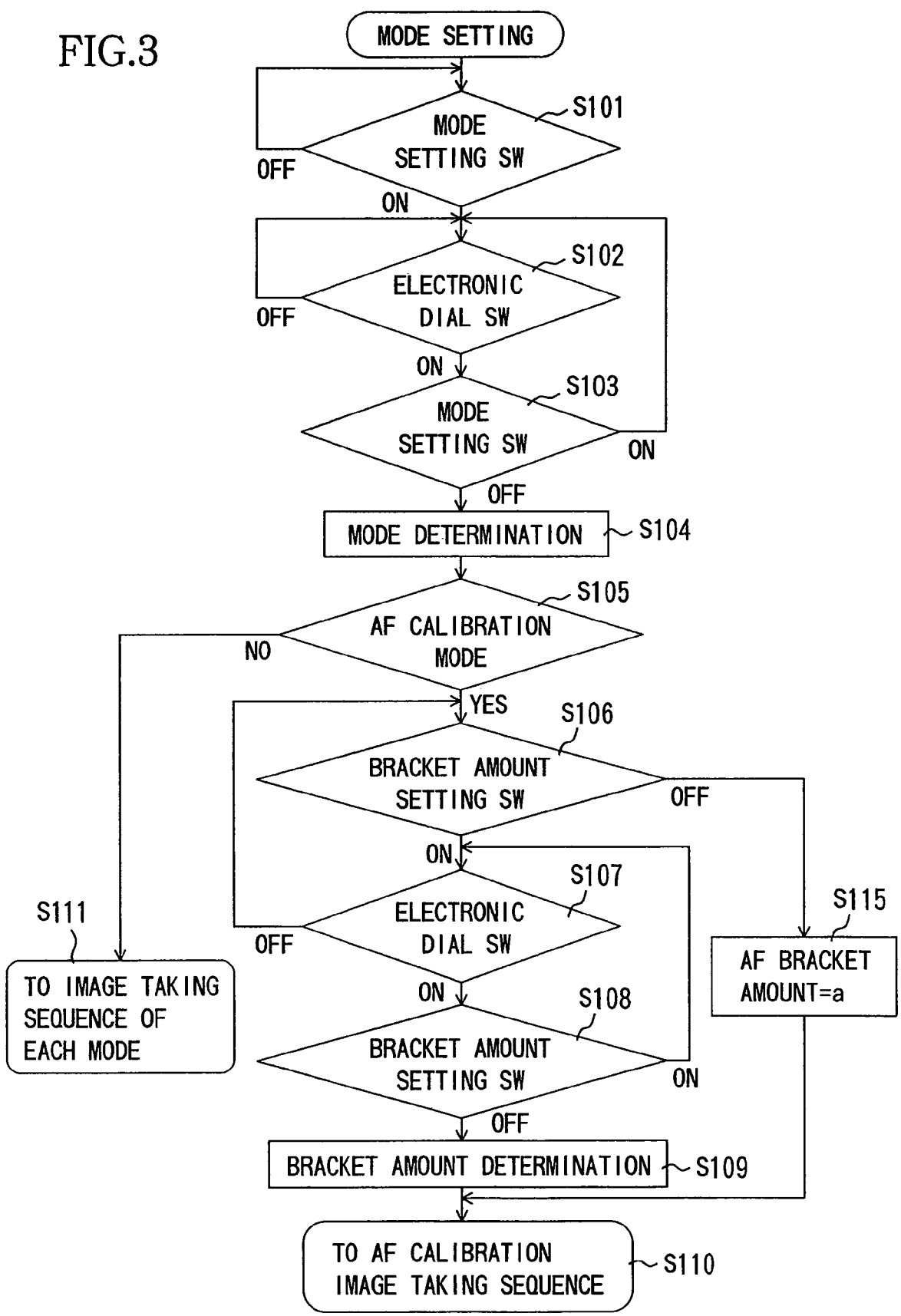
FIG. 3 shows a flowchart of a mode setting sequence to be performed in the electronic camera of Embodiment 1.

Next, the image-taking mode setting sequence is described with reference to FIG. 3. First, in Step S101, it is determined whether or not the mode setting switch 229 has been turned ON. When it is ON, it is determined that the mode setting operation has been started by the user and the process advances to Step S102.

In Step S102, the number of operating clicks of the electronic dial switch 226 is detected. When an electronic dial that turns the electronic dial switch 226 ON and OFF and is not shown is rotated in a certain direction, by each operating click, the image-taking mode can be switched cyclically to "TV priority mode", "AV priority mode", "Program mode", "AF calibration mode", "TV priority mode" . . . in sequence. When the electronic dial is rotated in reverse, by each operating click, the select mode can be changed cyclically to "TV priority mode", "AF calibration mode", "Program mode", "AV priority mode", "TV priority mode" . . . in sequence. The set mode is indicated on the operation indication circuit 225.

However, in regard to the "AF calibration mode", unless only one of the focus detecting areas 1 through 3 is selected in the focus detecting area selection sequence, the mode is not indicated on the operation indication circuit 225 and mode selection becomes impossible.

In the next Step S103, it is determined whether or not the mode setting switch 229 has been turned OFF. When it is turned OFF, in Step S104, the image-taking mode selected at this point is set.

In Step S105, it is determined whether or not the set image-taking mode is the AF calibration mode (first mode). When it is other than the AF calibration mode, that is, when it is the TV priority mode, the AV priority mode, or the program mode (each mode is the second mode), the process advances to Step S111 and an image-taking sequence that is not shown and corresponds to each image-taking mode is executed. When the AF calibration mode is set, the process advances to Step S106.

In Step S106, it is determined whether or not the bracket amount setting switch 232 has been turned ON. When it is ON, the process advances to Step S107. When it is not ON, the process advances to Step S115.

Herein, in the bracket image-taking for AF calibration (hereinafter, referred to as AF calibration image-taking), the amount of defocus (parameter relating to image-taking) is changed in sequence. Then, in Step S115, the AF bracket amount indicating the amount of change (amount of correction) with respect to the amount of defocus is set to the abovementioned adjusted value, and the process advances to Step S110 and the AF calibration image-taking sequence is executed. The adjusted value set at this point becomes a reference value of the amount of defocus to be changed in sequence in the AF calibration image-taking sequence.

Namely, when the reference image is taken in the AF calibration image-taking sequence, the driving amount of the focusing lens 101 is calculated on the basis of the total amount of the amount of defocus calculated based on the results of focus detection and the adjusted value, and the focusing lens 101 is driven. When the image other than the reference image is taken, image-taking is carried out by changing the driving amount of the focusing lens 101 by each AF bracket stepping amount described later from the adjusted value (reference value).

In Step S107, the number of operating clicks of the electronic dial switch 226 is detected. When the electronic dial that is not shown and turns the electronic dial switch 226ON and OFF is rotated in one arbitrary direction, the AF bracket stepping amount (predetermined amount) indicating the amount of change in the AF bracket amount can be changed, with respect to the stepping amount reference set value "a" described later, to "reference set value a×0.25", "reference set value a×0.5", "reference set value a", "reference set value a×2", and "reference set value a×4" in sequence. When the electronic dial is rotated in reverse, the AF bracket stepping amount can be changed in reverse of the abovementioned sequence.

However, "reference set value a×0.25" and "reference set value a×4" are lower limit and upper limit values of the AF bracket stepping amount, and even if the electronic dial is operated to change the amount to exceed these, this operation is ignored.

Figure 19:
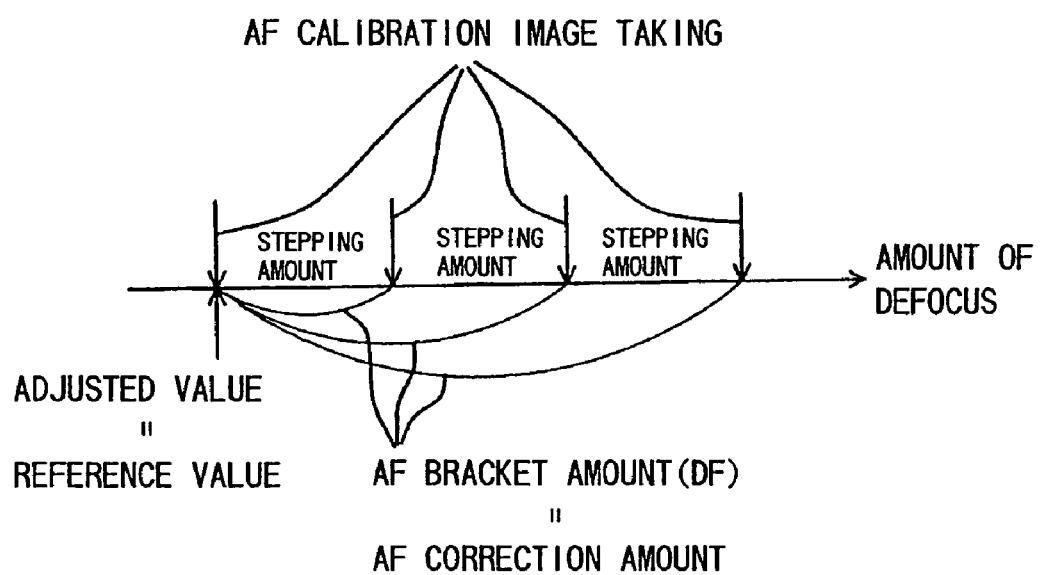
FIG. 19 is a drawing showing the relationship of an adjusted value, an AF bracket amount, and an AF bracket stepping amount in the electronic camera of Embodiment 1.

FIG. 19 shows the relationship of the adjusted value as a reference value of the amount of defocus, the AF bracket amount, and the AF bracket stepping amount (simply described as "stepping amount" in the figure).

Herein, the stepping amount reference set value "a" is determined by the following expression upon receiving open aperture value information (FNO) of the above-mentioned reference lens by the system controller 223.

Adjusted value a: $\delta = FNO \times \epsilon$

FNO represents the f-number information, and $\epsilon$ represents a diameter of the permissible circle of confusion.

The stepping amount reference set value "a" in this embodiment is set equal to the value of the depth of focus $\delta = FNO \times \epsilon$. In this embodiment, $\epsilon = 0.03$ mm. The stepping amount reference set value "a" thus determined is stored in the EEPROM 222 at the time of manufacturing.

Furthermore, by making the AF bracket stepping amount selectable as described above, the following becomes possible. Namely, even when great focus correction is necessary, by changing the AF bracket stepping amount in a phased manner (from a large stepping amount to a small stepping amount) in the AF calibration image-taking and carrying out focusing a plurality of times, the focus correction amount can be narrowed and determined to a proper value.

Next, in Step S108, it is determined whether or not the bracket amount setting switch 232 has been turned OFF. When it is OFF, in Step S109, the AF bracket stepping amount that has been selected at this point is set as an AF bracket stepping amount "A". Then, in Step S110, the process advances to the AF calibration image-taking sequence.

Figure 4A:
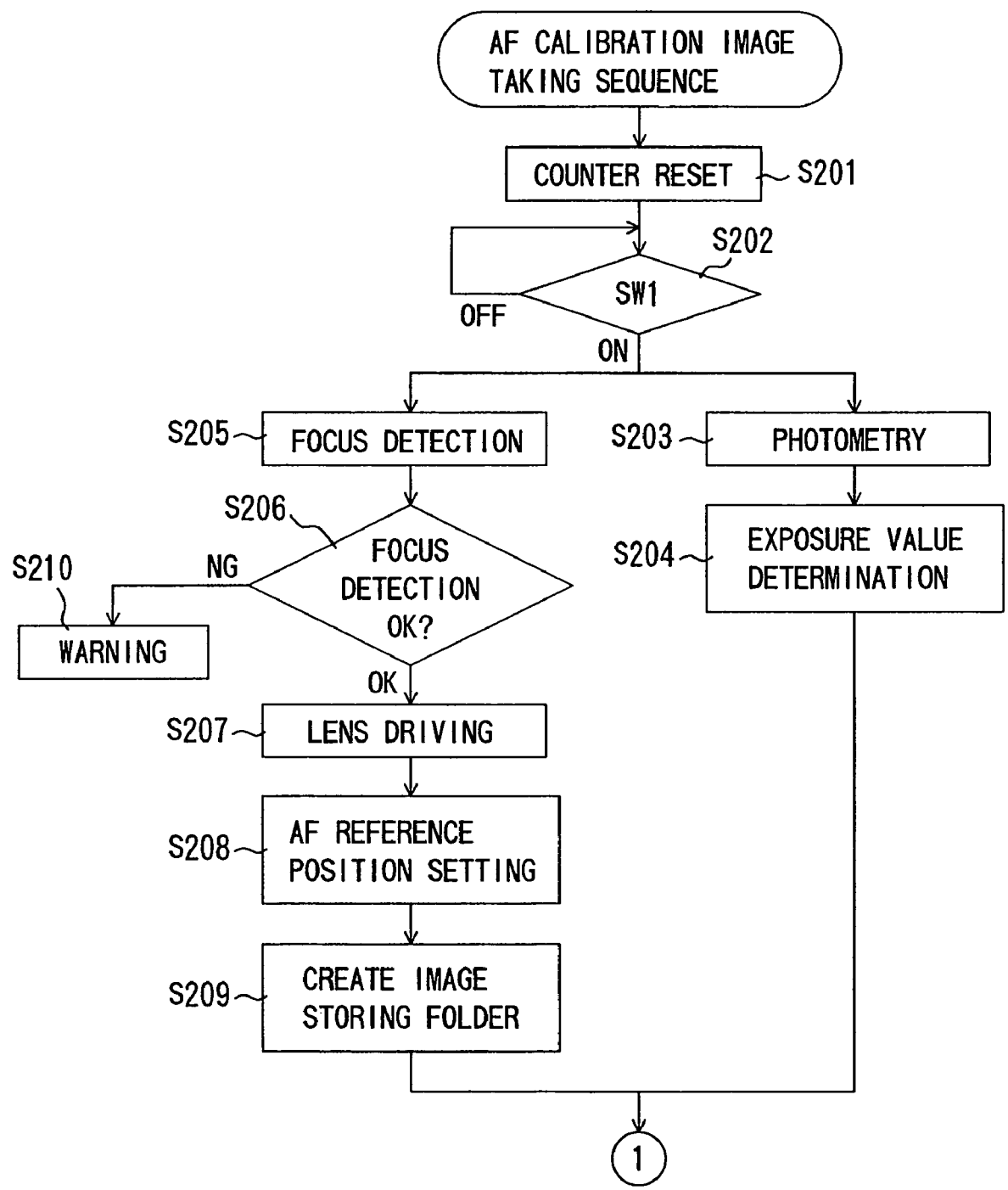
FIG. 4A and FIG. 4B show flowcharts of an AF calibration image-taking sequence to be performed in the electronic camera of Embodiment 1.
Figure 4B:
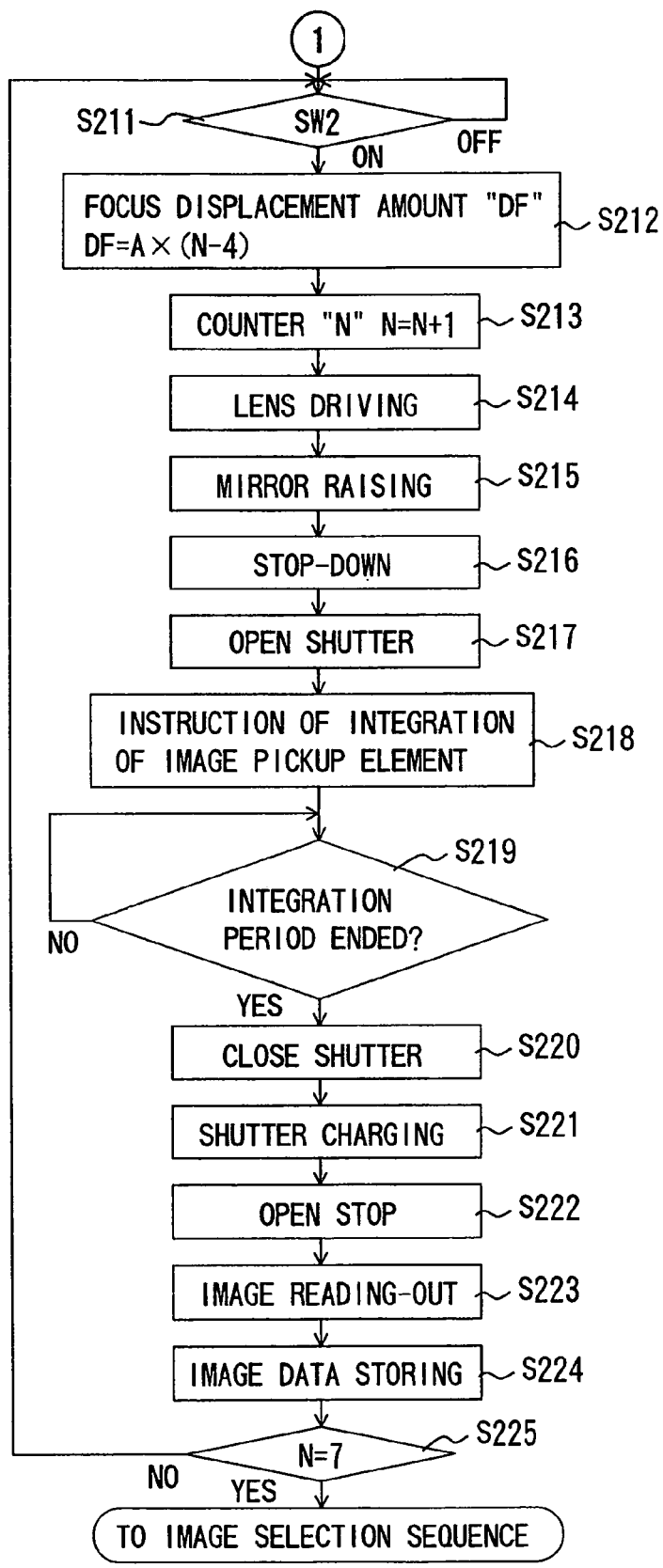

Next, the AF calibration image-taking sequence is described with reference to FIG. 4A and FIG. 4B. In FIG. 4A and. FIG. 4B, the portions attached with the same circled number are linked to each other. The same applies to A and B of other figures described later.

First, in Step S201, the system controller 223 resets the counter 233. Next, in Step S202, it is determined whether or not the release switch SW1 (231) has been turned ON. When it is ON, the process is branched and advances to Step S203 in which the amount of exposure for the AF calibration image-taking is determined and Step S205 in which focus detection is carried out.

In Step S203, the photometric circuit 207 performs photometry operation by using a light flux that passed through the image-taking lens 101, and was reflected by the quick return mirror 202, and passed through the pentaprism 201. In Step S204, the system controller 223 determines the amount of exposure (the f-number and the charge accumulation (integration) period of the image pickup element 210) during image-taking according to the output of the photometry circuit 207.

In Step S205, the system controller 223 carries out focus detection in the selected focus detecting area by using the AF sensor 204 and the focus detection circuit 205.

In Step S206, it is determined whether or not focus detection could be carried out. When an object as a target of focus detection is low in contrast or dark, focus detection may be impossible. Therefore, when focus detection could not carried out, the process advances to Step S210 and issues a warning, that is, indication on the image display circuit 213 and production of a beep sound from the buzzer 234 are performed. In the case where focus detection could be carried out, the process advances to Step S207.

In Step S207, on the basis of the results of focus detection obtained in Step S205, data on the lens driving amount is transmitted from the system controller 223 to the lens control circuit 104. The lens control circuit 104 converts the received data on the lens driving amount into a driving pulse number to be supplied to a stepping motor of the lens drive mechanism 103, and drives the focusing lens 101 by controlling the stepping motor.

At this point, in the case where the data on the AF correction amount has already been obtained through the executed calibration, the lens driving amount is calculated from the following expression.

Lens driving amount =

Results of focus detection (amount of defocus) + adjusted value (adjustment data of the amount of defocus when manufcturing) +

AF correction amount (AF calibration data).

In Step S208, the position of the focusing lens 101 driven in Step S207 (position where the amount of defocus becomes a reference value) is set as an AF reference position and is stored in an internal memory by the system controller 223. Then, in Step S209, the system controller 223 outputs an instruction of creation of a folder that stores the image data acquired through the AF calibration image-taking in the image data recording media 218 to the image data controller 220. The image data controller 220 creates a folder for storing AF calibration image data in the image data recording media 218 via the image compression circuit 219.

In Step S211, it is determined whether or not the release switch SW2 (230) has been turned ON. When it is ON, the process advances to Step S212.

In Step S212, the system controller 223 calculates the focus displacement amount (corresponding to the AF bracket amount mentioned above) "DF". Concretely, the system controller receives a current count number N from the counter 233 and calculates the focus displacement amount "DF" by the following expression.

$$DF = A \times (N-4)$$

Herein, "4" in (N−4) represents the central number of 7 that is the number of times of setting for the AF calibration image-taking in this embodiment. Therefore, in the AF calibration image-taking of this embodiment, an image taken at the focusing lens position where DF=A×(4−4)=0 (the amount of defocus becomes a reference value), three images taken when the focus displacement amount "DF" becomes negative with respect to the reference value, and three images taken when the focus displacement amount "DF" becomes positive with respect to the reference value are obtained.

In Step S213, the counter N is incremented by one.

Next, in Step S214, the system controller 223 transmits the focus displacement amount "DF" calculated in Step S212 to the lens control circuit 104. The lens control circuit 104 converts the lens driving amount into a driving pulse number to be supplied to the stepping motor of the lens drive mechanism 103, controls the stepping motor, and drives the focusing lens 101 by the driving amount obtained from the focus displacement amount "DF".

In Step S215, the system controller 223 controls the shutter charge and mirror drive mechanism 211 to raise the quick return mirror 202.

In Step S216, the f-number information set in Step S204 is transmitted to the stop control circuit 106. The stop control circuit 106 drives the stop drive mechanism 105 to stop the stop 102 down to the set f-number.

In Step S217, the system controller 223 controls the focal plane shutter 10 to open. Furthermore, in Step S218, the system controller 223 instructs the image data controller (DSP) 220 to perform a charge accumulation operation (integration operation) of the image pickup element 210. In Step S219, the process waits for the integration period determined in Step S204. Then, when the integration period ends, the process advances to Step S220 and the system controller 223 controls the focal plane shutter 10 to close.

The system controller 223 performs charging of the focal plane shutter 208 and lowers the quick return mirror 202 for preparation of the next operation in Step S221.

In Step S222, the system controller 223 drives the stop 102 to open. In Step S223, the system controller 223 instructs the image data controller 220 to take-in image data from the image pickup element 210. At this point, image data to be taken-in from the image pickup element 210 or an image data to be displayed on the image display circuit 213 may be image data obtained by enlarging a limited area including the focus detecting area, used (selected) for AF in the whole image-taking area, at its counter.

Next, in Step S224, the system controller 223 transmits the current focus displacement amount "DF" to the image data controller 220 and instructs recording of the image data on the image data recording media 218. The image data controller 220 that received this instruction records the lens ID information obtained by initial communications at the time of attachment of the image-taking lens 100, the image data and the focus displacement amount "DF" on the image data recording media 218 via the image compression circuit 219 by associating these with one another.

In Step S225, the value "N" of the counter is confirmed. When the counter value does not reach a predetermined value that indicates the maximum number of times of AF calibration image-taking (herein 7, however, other values are possible), the process returns to Step S211 and the AF calibration image-taking is repeated according to the operation of the release switch SW2 (230) performed by the user. At this point, the value of the focus displacement amount "DF" changes by each AF bracket stepping amount "A". Therefore, a plurality of images with focus displacement amounts "DF" (that is, amounts of defocus as a parameter relating to AF) different from each other are obtained. On the other hand, when the counter value reaches the predetermined value, it is determined that the AF calibration image-taking sequence has been completed, and the process advances to the AF calibration image selection sequence.

Figure 5:
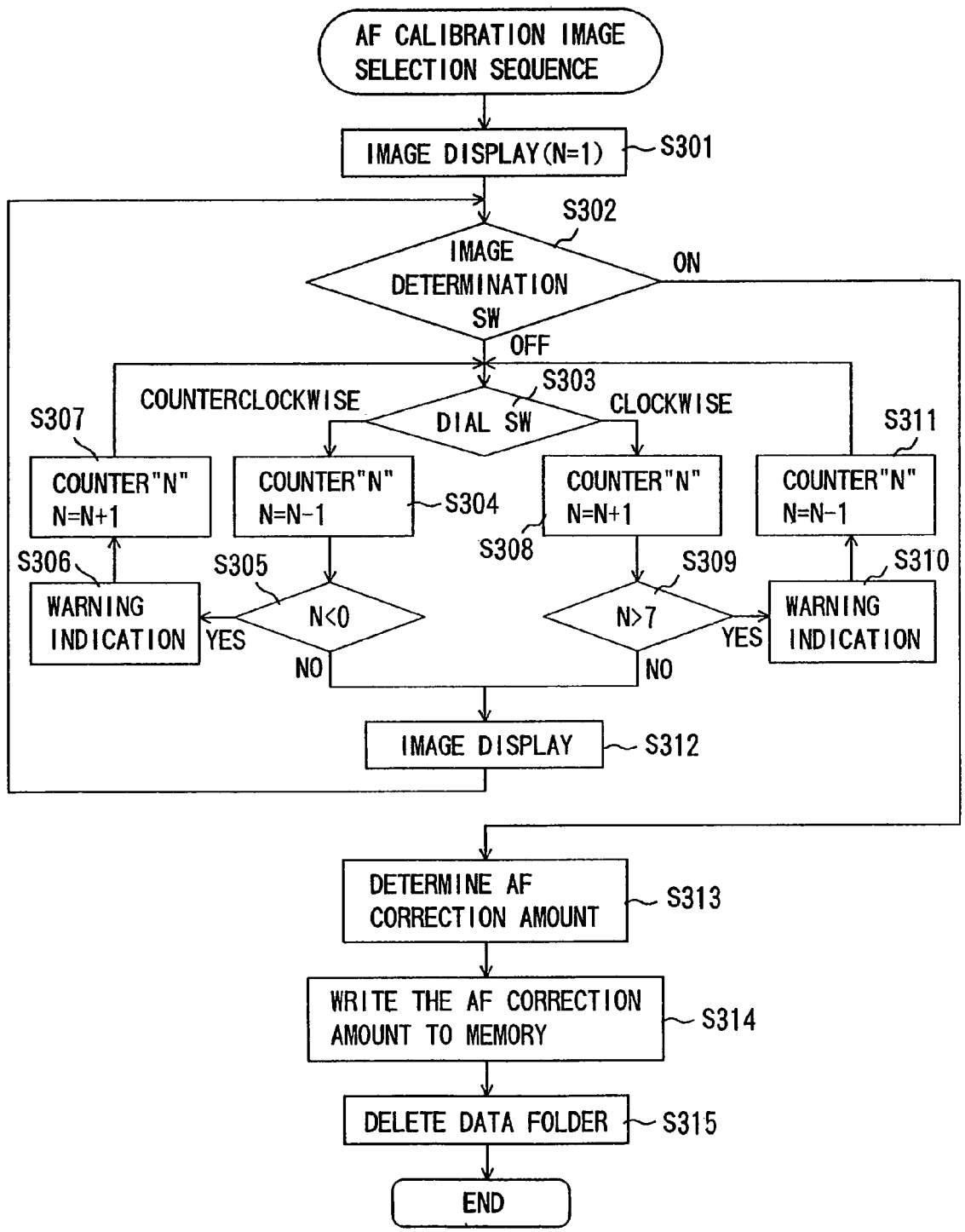
FIG. 5 shows a flowchart of an AF calibration image selection sequence to be performed in the electronic camera of Embodiment 1.

Next, the AF calibration image selection sequence is described with reference to FIG. 5.

In Step S301, the system controller 223 makes the image data controller 220 display the image data of the counter "1" taken through the AF calibration image-taking sequence on the image display circuit 213.

Herein, when the image data is displayed in the AF calibration image selection sequence, the image is subjected to image processing different from in the case where the image taken through the normal image-taking sequence is displayed as described later. Concretely, when the image taken through the normal image-taking sequence is displayed, in order to make the display fine, edge is enhanced. However, if the image data taken in the AF calibration mode is subjected to edge enhance processing, the image section that should be defocusing looks like focused. Therefore, when an image in which the focusing is optimal is selected from a group of images taken in the AF calibration mode, an image being defocused may be selected by mistake. Therefore, the images taken in the AF calibration mode are subjected to image processing different from that for the images taken through the normal image-taking sequence.

In Step S302, it is determined whether or not the image determination switch 227 has been turned ON. When it is ON, the process advances to Step S313. When it is not ON, the process advances to Step S303.

In Step S303, the operation state of the electronic dial switch 226 is detected. When the electronic dial is rotated counterclockwise, the process advances to Step S304, and when it is rotated clockwise, the process advances to Step S308.

In Step S304, the counter "N" is decremented by one. In Step S305, it is determined whether or not the counter "N" has become "O". When "N" is smaller than "O", in Step S306, a warning that image data taken in the AF calibration mode (hereinafter, referred to as AF calibration image data), which can be selected and displayed does not exist is issued by using the image display circuit 213 or by simultaneously using the image display circuit 213 and the buzzer 234, and in Step S307, the counter "N" is incremented by one. When it is determined that the counter "N" is larger than "O" in Step S305, the process advances to Step S312.

In Step S308, the counter "N" is incremented by one. In Step S309, it is determined whether or not the counter "N" is larger than "7". When "N" is larger than "7", in Step S310, a warning that no AF calibration image data that can be selected and displayed exists is issued by using the image display circuit 213 or by simultaneously using the image display circuit 213 and the buzzer 234, and in Step S311, the counter "N" is decremented by one. When it is determined in Step S309 that the counter "N" is smaller than "7". the process advances to Step S312.

In Step S312, the AF calibration image data corresponding to the counter "N" changed in response to the operation of the electronic dial switch 226 is read out from the image data recording media 218 and displayed on the image display circuit 213.

In Step S313, the focus displacement amount "DF" that has been recorded on the image data recording media 218 by being associated with the AF calibration image data selected in response to turning-ON of the image determination switch 227 in Step S302 is determined as an AF correction amount (AF calibration data).

Then, in Step S314, the AF correction amount determined in Step S313 is associated with the focus detecting area in which focus detection has been carried out, and further associated with the lens ID information which the lens control circuit 104 has and then written to the EEPROM 222.

In Step S315, all AF calibration image data and the AF calibration image data folder in the image data recording media 218 are deleted. Then, this flow is ended.

Figure 9A:
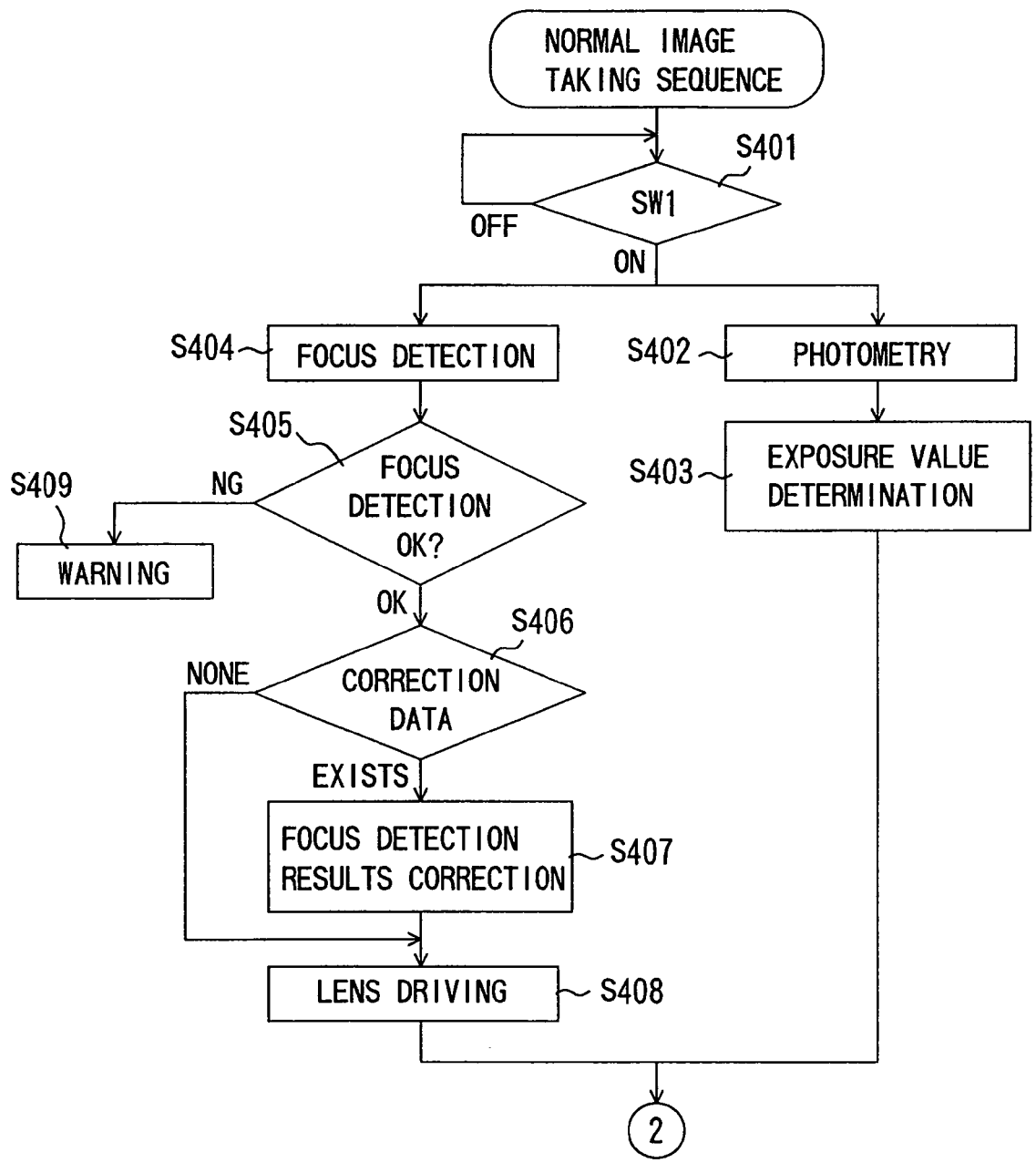
FIG. 9A and FIG. 9B show flowcharts of a normal image-taking sequence to be performed in the electronic camera of Embodiment 1.
Figure 9B:
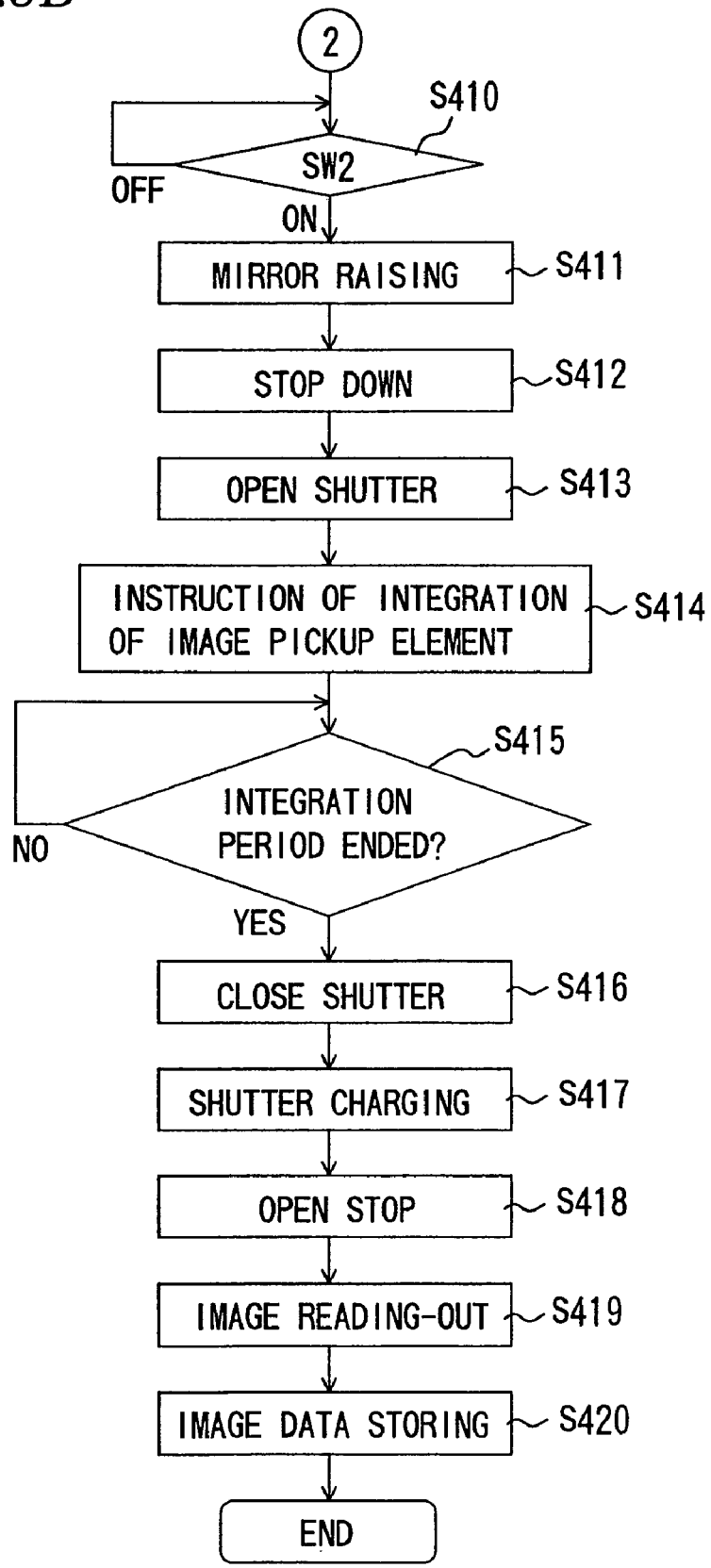

Next, the normal image-taking sequence is described with reference to FIG. 9A and FIG. 9B. Herein, the normal image-taking sequence is executed in the abovementioned "TV priority mode", "AV priority mode", and "Program mode", however, descriptions of operations unique to the respective modes are omitted and only operations common to these are described. The same applies to embodiments described later.

In Step S401, the system controller 223 determines whether or not the release switch SW1 (231) has been turned ON. When it is turned ON, the process is branched and advances to Step S402 in which the amount of exposure is determined and Step S404 in which focus detection is carried out.

In Step S402, the photometry circuit 207 performs photometry operation by using the light flux that passed through the image-taking lens 100, and was reflected by the quick return mirror 202, and passed through the pentaprism 201. In Step S403, the amount of exposure (an f-number and a charge accumulation (integration) period of the image pickup element 210) during normal image-taking is determined according to the output of the photometry circuit 207.

In Step S404, focus detection in the selected focus detecting area is carried out by using the AF sensor 204 and the focus detection circuit 205.

In Step S405, it is determined whether or not the focus detection could be carried out. When it could not be carried out, the process advances to Step S409 and a warning (indication on the image display circuit 213 and production of a beep sound from the buzzer 234) is issued. In the case where the focus detection could be carried out, the process advances to Step S406.

In Step S406, the lens ID information is read out from the EEPROM 222, and the image-taking lens 100 attached to the electronic camera 200 is identified. Furthermore, it is determined whether or not the AF correction amount (AF calibration data: AF correction amount stored in Step S314 of FIG. 5) of the focus detecting area selected for focus detection has been stored in EEPROM 222. When the AF correction amount is not stored, the process advances to Step S408 without adding an AF correction amount to the results of focus detection. When an AF correction amount is stored, in Step S407, this AF correction amount is read out and added to the results of focus detection, and then the process advances to Step S408.

In Step S408, on the basis of the results of focus detection, the adjusted value (the defocus amount adjustment data when manufacturing), and the AF correction amount, the driving amount of the focusing lens 101 (corrected lens driving amount) is calculated, and the results of this calculation are transmitted to the lens control circuit 104. The lens control circuit 104 converts the received data on the lens driving amount into a driving pulse number to be supplied to a stepping motor of the lens drive mechanism 103 and controls the stepping motor to drive the focusing lens 101.

Herein, in a case where the AF correction amount has been stored in EEPROM 222, the corrected lens driving amount is calculated by using the following expression.

Corrected lens driving amount =

Results of focus detection (amount of defocus) + Adjusted value (defocus amount adjustment data when manufacturing) +

AF correction amount (AF calibration data)

In Step S410, it is determined whether or not the release switch SW2 (230) has been turned ON. When it is ON, the process advances to Step S411.

In Step S411, the system controller 223 controls the shutter charge and mirror drive mechanism 211 to rise the quick return mirror 202.

In Step S412, the f-number information set in Step S403 is transmitted to the stop control circuit 106. The stop control circuit 106 stops the stop 102 down to the set f-number by driving the stop drive mechanism 105.

In Step S413, the focal plane shutter 10 is controlled to open. Furthermore, in Step S414, an instruction to carry out a charge accumulation operation (integration operation) of the image pickup element 210 is given to the image data controller (DSP) 220. In Step S415, the process waits for the integration period determined in Step S403. Then, when the integration period ends, the process advances to Step S416 and the focal plane shutter 10 is controlled to close.

Next, in Step S417, charging of the focal plane shutter 208 and lower-driving of the quick return mirror 202 are carried out for preparation of the next operation. In Step S418, the stop 102 is driven to open. In Step S419, the image data controller 220 is instructed to take-in image data from the image pickup element 210. In Step S420, the image data read out is recorded on the image data recording media 218 via the image compression circuit 219, and then this flow is ended.

In this embodiment, a folder for AF calibration image data is newly created in the image data recording media 218, and when AF calibration image data is selected and an AF correction value is determined and completely written to the EEPROM 222, the folder is deleted together with the AF calibration image data. However, if the memory capacity of the image data recording media 218 allows, the folder and the AF calibration image data may not be deleted. In this case, "folder creation operation" in Step S208 and the operation in Step S315 become unnecessary.

In this embodiment, the AF correction amount is stored by being associated with the lens ID information in the EEPROM 222 installed in the electronic camera 200. However, in a case where a storage element (for example, the memory of the lens control circuit 104) is installed in the image-taking lens 100, it is possible that the AF correction amount is stored in this storage element by being associated with the camera ID information that is identification information unique to the electronic camera 200.

In this embodiment, image display is carried out by the image display circuit 213 provided in the electronic camera 200 when the AF calibration image selection sequence is carried out. However, it is also possible that image data is transmitted to the external connected apparatus 300 through the communications interface circuit 224, and image display and image selection are carried out in the external connected apparatus 300. In this case, it is also possible that the image selection information is transmitted to the camera, and the camera determines the AF correction value according to an AF calibration image corresponding to this transmitted selection information.

Or, it is also possible that, in the camera, AF calibration images are recorded on recording media such as a semiconductor memory, an optical disk, or a magnetic disk, etc., and then an AF calibration image is read out from the recording media and displayed by external apparatus such as a computer, and image selection information selected by a user on the external apparatus is recorded on the recording media. Then, the recording media is re-loaded in the camera, and an AF correction value is determined according to the selected AF calibration image.

Furthermore, in this embodiment, the sequences are controlled by the system controller 223 inside the electronic camera 200, however, it is also possible that the sequences are executed by controlling the system controller 223 by the external connected apparatus 300 via the communications interface circuit 224.

Furthermore, in this embodiment, the AF bracket amount is determined on the basis of the open f-number of the image-taking lens 100, however, the AF bracket amount can be changed according to the focal length of the image-taking lens. Furthermore, when the image-taking lens is a zooming lens, it is possible that an AF correction value is calculated for each focal length and is stored.

According to this embodiment described above, AF calibration image-taking is carried out a plurality of times while changing the focal position (amount of defocus), and taken image data is recorded on the recording media by being associated with the amount of change in focal position from the reference position (focus displacement amount). Furthermore, after finishing image-taking, a user selects an image that user regards as focused optimally from the taken image data, and the focus displacement amount recorded in association with the selected image data is stored as a focal position correction amount for autofocus control (AF correction amount). Then, during normal image-taking, the adjusted amount at the time of manufacturing is corrected by using the AF correction amount to carry out autofocusing. Therefore, a taken image which is in an optimal in-focus state for the user can be obtained. Furthermore, the user can easily select the AF correction amount.

According to this embodiment, the interval (AF bracket stepping amount) of selection of the focus displacement amount is changeable, so that a more optimal AF correction amount can be obtained.

Furthermore, according to this embodiment, manufacturing errors of the camera and manufacturing errors of the image-taking lens can be satisfactorily and easily corrected by a user.

In addition, according to this embodiment, when image data is read out from the image pickup element, only a limited area including the focus detecting area is read out, so that the period required for image reading-out can be shortened.

Furthermore, according to this embodiment, since an exclusive folder is created in the image data recording media as a folder for storing image data taken through AF calibration image-taking, the image data is prevented from being mistaken for image data taken through normal image-taking.

In addition, according to this embodiment, since the image data taken through AF calibration image-taking is deleted after the AF correction amount is determined and stored, the memory capacity of the image data recording media can be efficiently used.

Furthermore, according to this embodiment, since the AF correction amount is recorded on a storage element provided in the camera by being associated with the lens ID information and the selected focus detecting area, an AF correction amount can be set for each of a plurality of image-taking lenses and for each of the focus detecting areas in normal image-taking.

In addition, the AF correction amount is stored in a storage element provided in the image-taking lens side by being associated with the camera ID information and the selected focus detecting area, so that an AF correction amount can be set for each of a plurality of cameras and for each of the focus detecting areas in normal image-taking.

Embodiment 2

Embodiment 2 of the invention is described with reference to FIG. 1, FIG. 6, and FIG. 10 through FIG. 14. The structure of the electronic camera in this embodiment is the same as that of Embodiment 1, and common components are attached with the same symbols as in Embodiment 1 in place of description. This embodiment relates to auto exposure.

Figure 10:
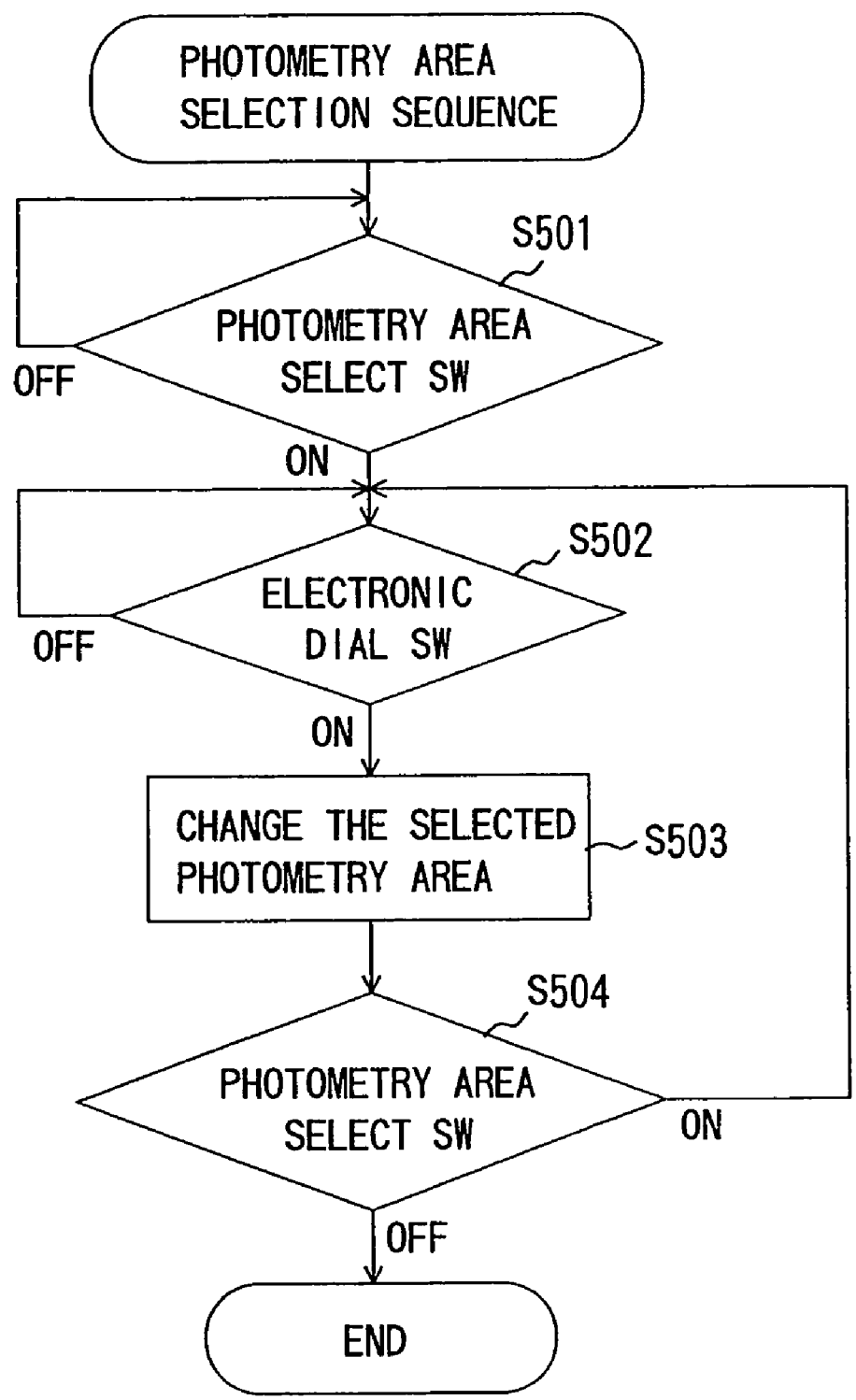
FIG. 10 shows a flowchart of a photometry area selection sequence to be performed in an electronic camera of Embodiment 2 of the invention.

The photometry area selection sequence is described with reference to FIG. 10. In Step S501, the system controller 223 determines whether or not the photometry area select switch 235 has been turned ON. When it is QN, the process advances to Step S502.

In Step S502, it is determined whether or not the electronic dial switch 226 has been operated. When it is operated, the direction and amount of operation are detected.

In Step S503, according to the direction and amount of operation of the electronic dial switch 226 in Step S502, the photometry area is changed. The photometry area to be selected is switched cyclically to all area, photometry area 1, photometry area 2, photometry area 3, and all area in sequence.

In Step S504, it is determined whether or not the photometry area select switch 235 has been turned ON again. When it is ON, the process returns to Step S502, and when it is not ON, this flow is ended.

Next, the image-taking mode setting sequence is described with reference to FIG. 11. In Step S601, the system controller 223 determines whether or not the mode setting switch 229 has been turned ON. When it is ON, it is determined that the mode setting operation has been started by a user, and the process advances to Step S602.

In Step S602, the number of operating clicks of the electronic dial switch 226 is detected. When an electronic dial that is not shown and which turns the electronic dial switch 226 ON and OFF is rotated in a certain direction, by each operating click, the image-taking mode can be changed cyclically to "TV priority mode", "AV priority mode", "Program mode", "AE calibration mode", and "TV priority mode". When the electronic dial is rotated in reverse, by each operating click, the image-taking mode can be changed cyclically to "TV priority mode", "AE calibration mode", "Program mode", "AV priority mode" and "TV priority mode" . . . The set image-taking mode is indicated on the operation indication circuit 225.

Next, in Step S603, it is determined whether or not the mode setting switch 229 has been turned OFF. When it is OFF, an image-taking mode selected at this point is set in Step S604.

Next, in Step S605, it is determined whether or not the set image-taking mode is the AE calibration mode (first mode). When it is a mode other than the AE calibration mode, that is, when it is the TV priority mode, the AV priority mode, or the program mode (each mode is a second mode), the process advances to Step S611, and an image-taking sequence, which is not shown and corresponds to each image-taking mode, is executed. When it is the AE calibration mode, the process advances to Step S606.

In Step S606, it is determined whether or not the bracket amount setting switch 232 has been turned ON. When it is ON, the process advances to Step S607. When it is not ON, the process advances to Step S615.

Herein, in the bracket image-taking for AE calibration (hereinafter, referred to as AE calibration image-taking), the exposure value (parameter relating to image-taking) is changed in sequence. Then, in Step S615, an AE bracket amount indicating an amount of change (correction) in exposure value from the results of calculation on the basis of the results of photometry is set to an adjusted value obtained by exposure adjustment at the time of manufacturing, and the process advances to Step S610 and the AE calibration image-taking sequence is executed. This adjusted value becomes a reference value of the amount of exposure to be shifted in sequence in the AE calibration image-taking sequence.

Namely, when a reference image is taken in the AE calibration image-taking sequence, an actual exposure value is calculated on the basis of the exposure value calculated on the basis of the results of photometry and the adjusted value. Then, when images other than the reference image are taken, image-taking is carried out by changing the exposure value by each AE bracket stepping amount described later from the adjusted value (reference value).

In Step S607, the number of operating clicks of the electronic dial switch 226 is detected. When an electronic dial, which is not shown and turns the electronic dial switch 226 ON and OFF, is rotated in an arbitrary direction, with respect to a stepping amount reference set value "b" described later, the AE bracket stepping amount (predetermined amount) indicating the amount of change in AE bracket amount can be changed by each operating click to "reference set value b×0.25", "reference set value b×0.5", "reference set value b", "reference set value b×2" and "reference set value b×4" in sequence. When the electronic dial is rotated in reverse, the AE bracket stepping amount can be changed in reverse of the abovementioned sequence.

However, "reference set value b×0.25" and "reference set value b×4" are lower limit and upper limit values of the AF bracket stepping amount, and even if the electronic dial is operated to change the AF bracket stepping amount to exceed these, this operation is ignored.

Furthermore, the relationship of the adjusted value (reference value), the AE bracket amount, and the AE bracket stepping amount is similar to that of the AF calibration shown in FIG. 19. Furthermore, the stepping amount reference set value "b" is, for example, a value set in advance, and in detail, it is 0.1 steps.

Next, in Step S608, it is determined whether or not the bracket amount setting switch 232 has been turned OFF. When it is OFF, in Step S609, the bracket stepping amount "B" is set to the bracket stepping amount that has been selected in Step S608. Then, in Step S610, the process advances to the AE calibration image-taking sequence.

Figure 12A:
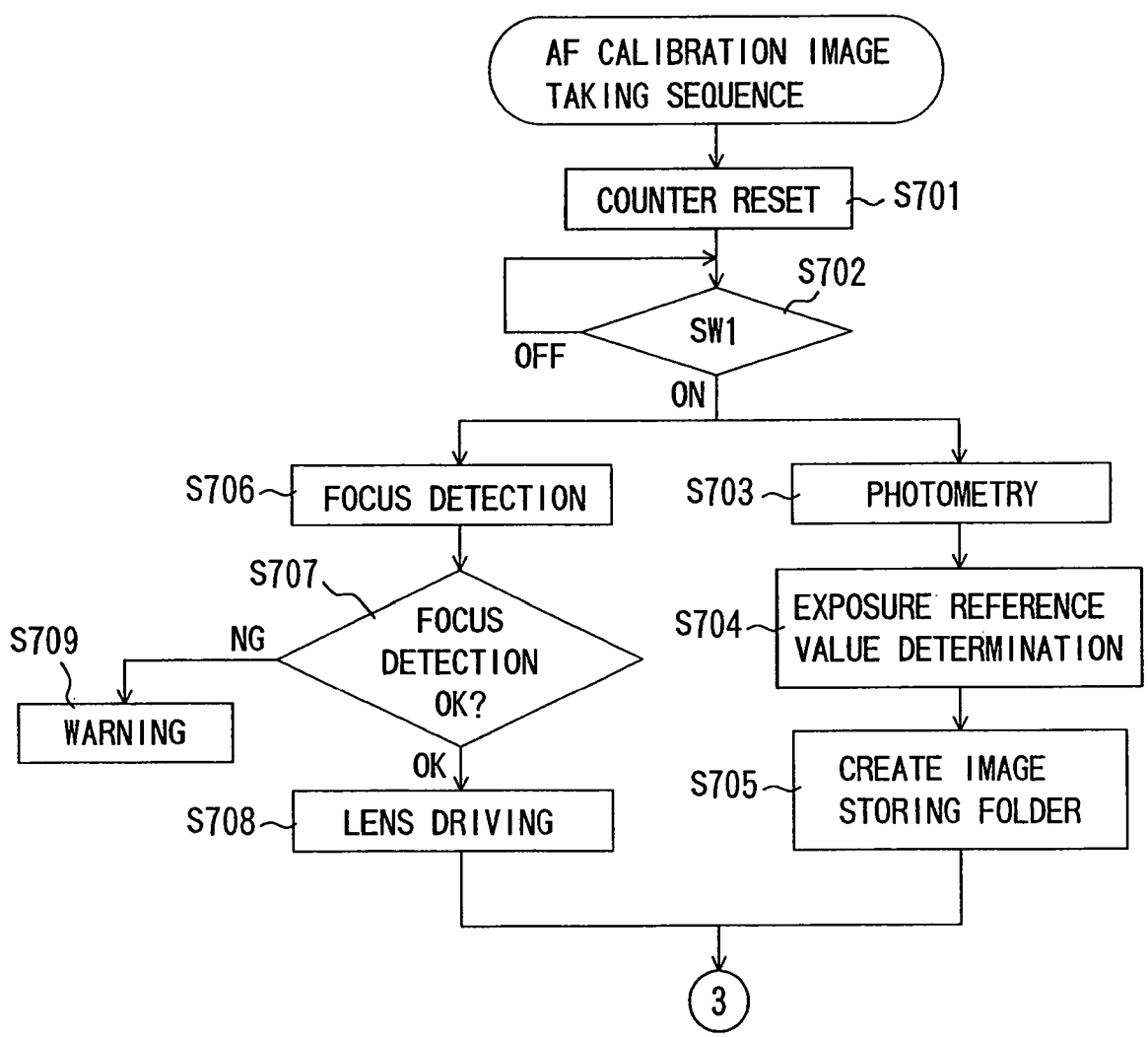
FIG. 12A and FIG. 12B show flowcharts of an AE calibration image-taking sequence to be performed in the electronic camera of Embodiment 2.
Figure 12B:
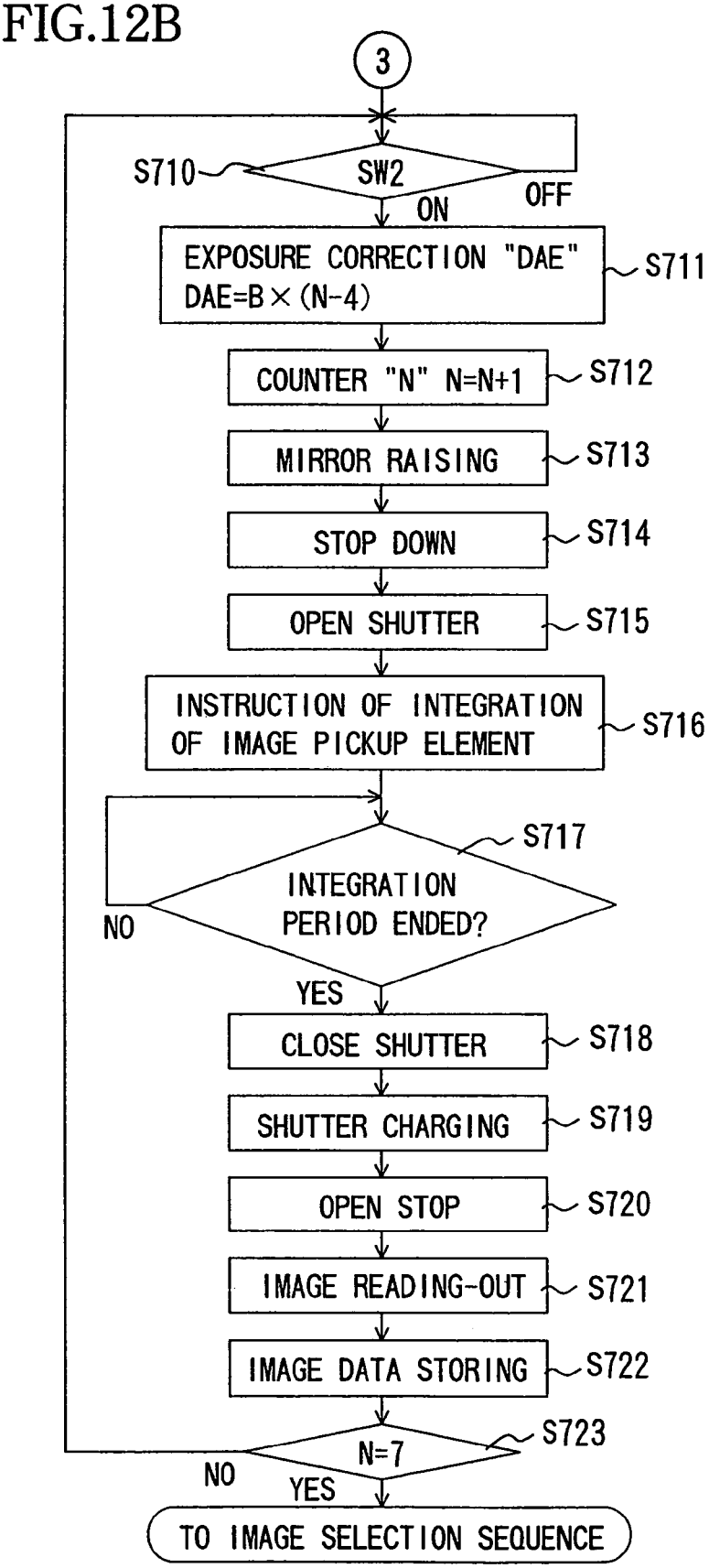

Next, the AE calibration image-taking sequence is described with reference to FIG. 12A and FIG. 12B. In Step S701, the system controller 223 resets the counter 233.

In Step S702, it is determined whether or not the release switch SW1 (231) has been turned ON. When it is ON, the process is branched and advances to Step S703 in which an exposure value (an f-number and a charge accumulation (integration) period of the image pickup element 210) is determined and Step S706 in which focus detection is carried out.

In Step S703, the photometry circuit 207 performs photometry operation by using the light flux that passed through the image-taking lens 100, and was reflected by the quick return mirror 202, and passed through the pentaprism 201.

In Step S704, the system controller 223 calculates an exposure reference value according to the output of the photometry circuit 207.

At this point, in a case where data on the AE correction amount has been obtained through calibration that has already been carried out, the exposure reference value is calculated by using the following expression $$\text{Exposure reference value} = \text{the results of photometry (exposure value)} +$$
$$\text{adjusted value(exposure value adjustment data at the time of manufacturing)} +$$
$$\text{AE correction amount (AE calibration data)}.$$

Then, in Step S705, the system controller 223 instructs the image data controller 220 to create an exclusive folder for storing image data taken through AE calibration image-taking (hereinafter, referred to as AE calibration image data) in the image data recording media 218. The image data controller 220 creates a folder for storing the AE calibration image data in the image data recording media 218 via the image compression circuit 219.

In Step S706, focus detection in a selected focus detecting area is carried out by using the AF sensor 204 and the focus detection circuit 205.

In Step S707, it is determined whether or not focus detection could be carried out. In some cases where the object as a target of focus detection is low in contrast or dark, the focus detection cannot be carried out. Therefore, when the focus detection could not be carried out, the process advances to Step S709 and a warning (indication on the image display circuit 213 and production of a beep sound from the buzzer 234) is issued. When the focus detection could be carried out, the process advances to Step S708.

In Step S708, on the basis of the results of focus detection obtained in Step S706, a lens driving amount is transmitted to the lens control circuit 104 from the system controller 223. The lens control circuit 104 controls the lens drive mechanism 103 on the basis of the received lens driving amount, and drives the focusing lens 101 to an in-focus position.

In Step S710, it is determined whether or not the release switch SW2 (230) has been turned ON. When it is ON, the process advances to Step S711.

In Step S711, an exposure correction amount (corresponding to the abovementioned AE bracket amount) "DAE" is calculated. In detail, the current count number N is received from the counter 233 and the exposure correction amount "DAE" is calculated by using the following expression.

$$DAE = B \times (N-4)$$

Herein, "4" of (N−4) is the central value of 7 that is the number of setting times of AE calibration image-taking. Therefore, in the AE calibration image-taking of this embodiment, an image taken when DAE=B×(4−4)=0, that is, an image taken with the exposure reference value, three images taken when the exposure correction amount "DAE" is negative with respect to the exposure reference value, and three images taken when the exposure correction amount "DAE" is positive with respect to the exposure reference value are obtained.

In Step S712, the counter N is incremented by one.

In Step S713, the system controller 223 controls the shutter charge and mirror drive mechanism 211 to rise the quick return mirror 202.

In Step S714, information on the f-number set in Step S704 is transmitted to the stop control circuit 106. The stop control circuit 106 stops the stop 102 down to the set f-number by driving the stop drive mechanism 105.

In Step S715, the focal plane shutter 208 is controlled to open. Furthermore, in Step S716, an instruction to carry out a charge accumulation operation (integration operation) of the image pickup element 210 is given to the image data controller 220 (DSP).

In Step S717, the process waits for the integration period determined in Step S704. Then, when the integration period ends, the process advances to Step S718 and the focal plane shutter 208 is controlled to close. The integration period changes according to the exposure correction amount "DAE".

Next, in Step S719, charge-driving of the focal plane shutter 208 and lower-driving of the quick return mirror 202 are carried out for preparation of the next operation.

In Step S720, the stop 102 is driven to open. Then, in Step S721, the image data controller 220 is instructed to take-in image data from the image pickup element 210. At this point, the image data to be taken-in from the image pickup element 210 or the image data to be displayed on the image display circuit 213 may be image data obtained by enlarging a limited area including the photometry area, in which photometry operation has been carried out (selected), at its center in the whole image-taking area.

In Step S722, the current exposure correction amount "DAE" is transmitted to the image data controller 220 and an instruction to record the image data on the image data recording media 218 is given to the image data controller 220. The image data controller 220 that has received this instruction records the lens ID information obtained by initial communications when the image-taking lens 100 is attached, the image data, and the exposure correction amount "DAE" on the image data recording media 218 via the image compression circuit 219 by associating these with each other.

In Step S723, the value of the counter "N" is confirmed. When the counter value does not reach the predetermined value indicating the maximum number of times of the AE calibration image-taking (herein 7, however, other values are possible), the process returns to Step S710, and according to the operation of the release switch SW2 (230) performed by the user, the AE calibration image-taking is repeated. At this point, the value of the exposure correction amount "DAE" changes by each AE bracket stepping amount "B". Therefore, a plurality of images with exposure correction amounts "DAE" (that is, exposure values as a parameter relating to AE) different from each other are taken. On the other hand, when the counter value reaches the predetermined value, it is determined that the AE calibration image-taking sequence has been completed, and the process advances to the AE calibration image selection sequence.

When the counter value reaches the predetermined value (7 in this embodiment), it is determined that the AE calibration image-taking sequence has been completed, and the process advances to the AE calibration image selection sequence.

Figure 13:
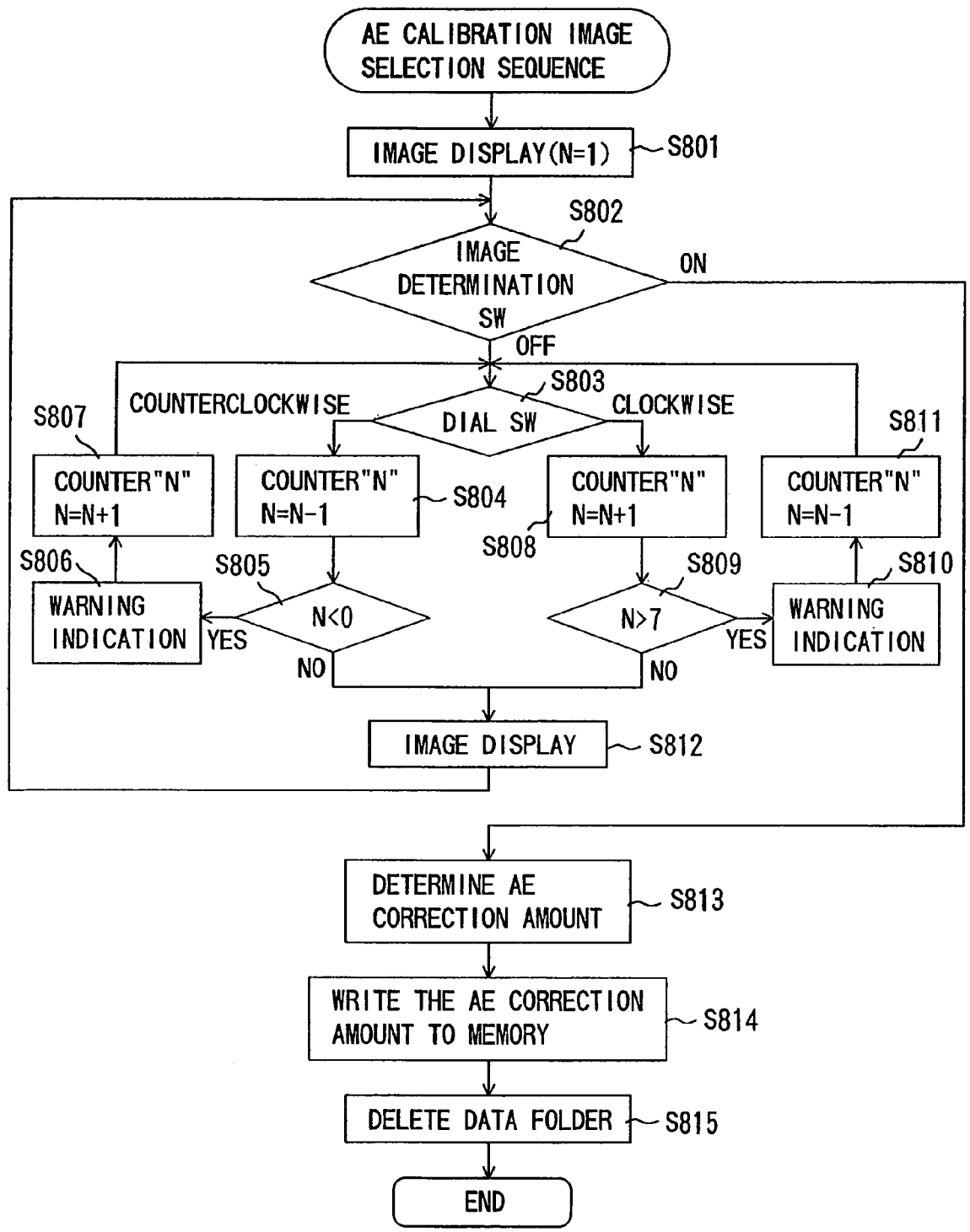
FIG. 13 shows a flowchart of an AE calibration image selection sequence to be performed in the electronic camera of Embodiment 2.

Next, the AE calibration image selection sequence is described with reference to FIG. 13. In Step S801, the system controller 223 makes the image data controller 220 display the image data corresponding to the counter "1" taken through the AE calibration image-taking sequence on the image display circuit 213.

In Step S802, it is determined whether or not the image determination switch 227 has been turned ON. When it is ON, the process advances to Step S813. When it is not ON, the process advances to Step S803.

In Step S803, the operation state of the electronic dial switch 226 is detected. When the electronic dial is rotated counterclockwise, the process advances to Step S804, and when it is rotated clockwise, the process advances to Step S808.

In Step S804, the counter "N" is decremented by one. In Step S805, it is determined whether or not the counter "N" is "O". When "N" is smaller than "O", in Step S806, a warning that no AE calibration image data that can be selected and displayed exists is issued by using the image display circuit 213 or by simultaneously using the image display circuit 213 and the buzzer 234, and the counter "N" is incremented by one in Step S807.

When it is determined that the counter "N" is larger than "O" in Step S805, the process advances to Step S812.

In Step S808, the counter "N" is incremented by one. In Step S809, it is determined whether or not the counter "N" is larger than "7". When the counter "N" is larger than "7", in Step S810, a warning that no AE calibration image data that can be selected and displayed exists is issued by using the image display circuit 213 or by simultaneously using the image display circuit 213 and the buzzer 234, and the counter "N" is decremented by one in Step S811. When it is determined that the counter "N" is equal to or smaller than "7" in Step S809, the process advances to Step S812.

In Step S812, AE calibration image data corresponding to the counter "N" changed due to operation of the electronic dial switch 226 is read out from the image data recording media 218 and displayed on the image display circuit 213.

In Step S813, the exposure correction amount "DAE" recorded on the image data recording media 218 in association with the AE calibration image data when the image determination switch 227 is turned ON in Step S802 is determined as an AE correction amount (AE calibration data).

Then, in Step S814, the AE correction amount determined in Step S813 is written to the EEPROM 222 by being associated with the photometry area in which the photometry operation is carried out and the tens ID information that the lens control circuit 104 has.

Next, in Step S815, all the AE calibration image data and the AE calibration image data folder are deleted from the image data recording media 218. Then, this flow is ended.

Figure 14A:
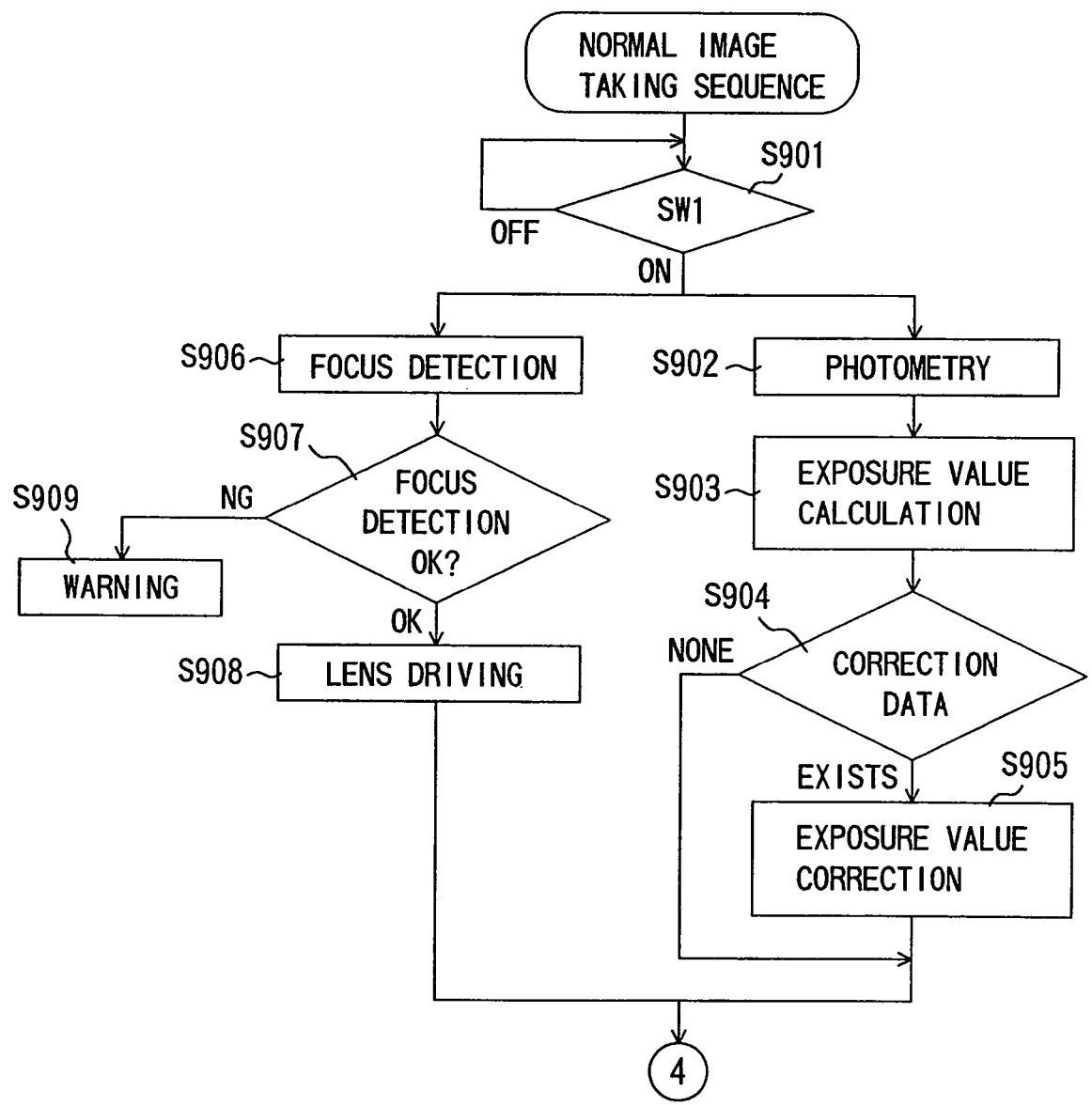
FIG. 14A and FIG. 14B show flowcharts of a normal image-taking sequence to be performed in the electronic camera of Embodiment 2.
Figure 14B:
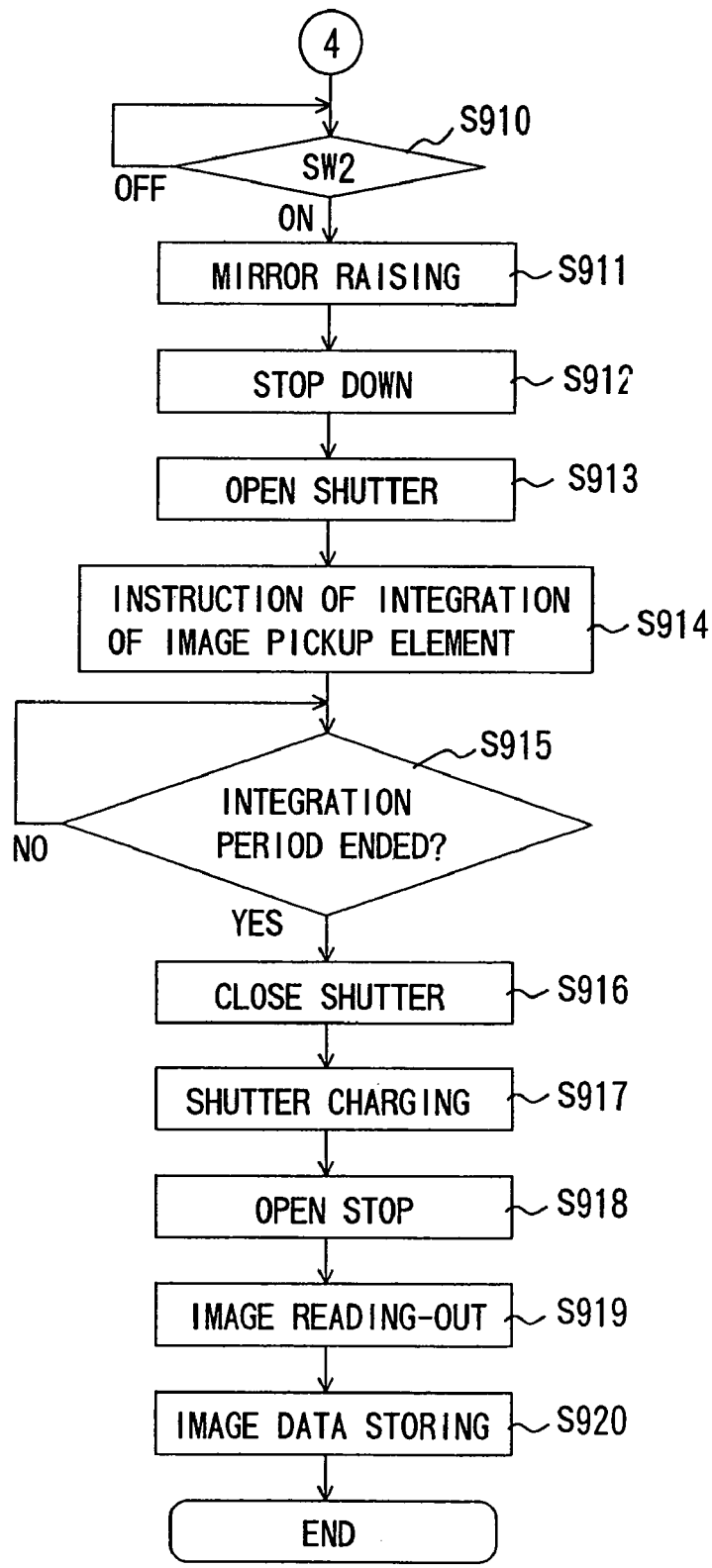

Next, the normal image-taking sequence is described with reference to FIG. 14A and FIG. 14B. In Step S901, the system controller 223 determines whether or not the release switch SW1 (231) has been turned ON. When it is ON, the process is branched and advances to Step S902 in which an exposure value (an f-number and a charge accumulation (integration) period of the image pickup element 210) during image-taking is determined and Step S906 in which focal detection is carried out.

In Step S902, the photometry circuit 207 performs photometry operation by using a light flux that passed through the image-taking lens 100, and was reflected by the quick return mirror 202 and passed through the pentaprism 201.

In Step S903, the exposure value during image-taking is calculated according to the output of the photometry circuit 207.

In Step S904, the lens ID information is read out from the EEPROM 222, and the image-taking lens 100 attached to the electronic camera 200 is identified. Furthermore, it is determined whether or not the AE correction amount (AE calibration data: AE correction amount stored in Step S814 in FIG. 13) in the photometry area selected for photometry has been stored in the EEPROM 222. When the AE correction amount is not stored, the process advances to Step S910 without adding the AE correction amount to the results of photometry. When the AE correction amount is stored, in Step S905, the AE correction amount is read out and added to the results of photometry, and then an exposure value after being corrected is calculated.

Namely, the exposure value after being corrected is calculated by using the following expression.

The exposure value after being corrected = the results of photometry (exposure value) + adjusted value (exposure value adjustment data at the time of manufacturing) +

AE correction amount (AE calibration data).

Then, the process advances to Step S910.

On the other hand, in Step S906, the system controller 223 carries out focus detection in the selected focus detecting area by using the AF sensor 204 and the focus detection circuit 205.

Furthermore, in Step S907, it is determined whether or not focus detection could be carried out. When the focus detection could not be carried out, the process advances to Step S909 and a warning (indication on the image display circuit 213 and production of a beep sound from the buzzer 234) is issued. When the focus detection could be carried out, the process advances to Step S908.

In Step S908, the focusing lens 101 is driven according to the results of focus detection. Then, the process advances to Step S910.

In Step S910, it is determined whether or not the release switch SW2 (230) has been turned ON. When it is ON, the process advances to Step S911.

In Step S911, the system controller 223 controls the shutter charge and mirror drive mechanism 211 to rise the quick return mirror 202.

In Step S912, information on the f-number set in Step S903 is transmitted to the stop control circuit 106. The stop control circuit 106 drives the stop drive mechanism 105 to stop the stop 102 down to the set f-number.

In Step S913, the focal plane shutter 208 is controlled to open. Furthermore, in Step S914, an instruction to carry out an integration operation of the image pickup element 210 is given to the image data controller 220 (DSP).

In Step S915, the process waits for the integration period. Herein, the integration period is the period calculated in Step S903 when the AE correction amount is not stored in the EEPROM 222, and is a period corrected in Step S905 when the AE correction amount is stored in the EEPROM 222. Then, when the integration period elapses, the process advances to Step S916 and the focal plane shutter 208 is controlled to close.

Next, in Step S917, charging of the focal plane shutter 208 and lower-driving of the quick return mirror 202 are carried out for preparation for the next operation.

In Step S918, the stop 102 is driven to open. In Step S919, the image data controller 220 is instructed to take-in image data from the image pickup element 210. In Step S920, the image data read out is recorded on the image data recording media 218 through the image compression circuit 219. Then, this flow is ended.

In this embodiment, an AE calibration image data folder is newly created in the image data recording media 218, and when the AE calibration image selection is finished and the determination and writing of the AE correction amount (AE calibration data) are completed, the image data and the folder are both deleted. However, if the memory capacity of the image data recording media 218 allows, these may not be deleted. In this case, the "folder creating operation" in Step S705 and the operation in Step S815 become unnecessary.

Furthermore, in this embodiment, the AE correction amount is stored in the EEPROM 222 provided in the electronic camera 200 by being associated with the lens ID information. However, in a case where a storage element (for example, a memory that the lens control circuit 104 has) is provided inside the image-taking lens 100, it is also possible that the AF correction amount is stored in this storage element by being associated with camera ID information that is identification information unique to the electronic camera 200.

In this embodiment, image display is carried out by using the image display circuit 213 provided in the electronic camera 200 when the AE calibration image selection sequence is carried out. However, it is also possible that image data is transmitted to an external connected apparatus 300 through the communications interface circuit 224, and image display and image selection are carried out in the external connected apparatus 300. In this case, it is possible that the image selection information is transmitted to the camera, and the camera determines an AE correction value according to the AE calibration image corresponding to this transmitted image selection information.

Or, in the camera, AE calibration images are recorded on recording media such as a semiconductor memory, an optical disk, or a magnetic disk, etc., an AE calibration image is read out from the recoding media and displayed by external apparatus such as a computer, etc., and the image selection information selected by the user with the external apparatus is recorded on the recording media. Then, the recording media is re-loaded to the camera, and an AE correction value is determined according to the selected AE calibration image. Furthermore, in this embodiment, the respective sequences are controlled by the system controller 223 inside the electronic camera 200, however, it is also possible that the respective sequences are executed by controlling the system controller 223 via the communications interface 224 by the external connected apparatus 300.

Furthermore, in this embodiment, when the image-taking lens is a zooming lens, it is possible that an AE correction value is determined for each focal length and is stored.

According to this embodiment described above, AE calibration image-taking is carried out a plurality of times while changing the exposure value, and the taken image data and the amount of change (exposure correction amount) in exposure value from the reference value are recorded on the recording media by being associated with each other. Furthermore, after finishing the image-taking, an image with exposure that the user regards as optimal is selected from the taken image data, and the exposure correction amount recorded by being associated with the selected image data is stored as an exposure correction amount for auto exposure control (AE correction amount). In the normal image-taking, auto exposure is carried out by correcting the adjustment amount at the time of manufacturing by using the AE correction amount. Therefore, a taken image in an exposure state optimal for the user can be obtained. Furthermore, a user can easily select exposure setting in the auto exposure control.

Furthermore, according to this embodiment, the interval (AE bracket stepping amount) of selection of the exposure correction amount is changeable, so that a more optimal AE correction amount can be obtained.

Furthermore, according to this embodiment, manufacturing errors of the camera and manufacturing errors of the image-taking lens can be easily and satisfactorily corrected by a user.

Furthermore, according to this embodiment, when image data is read out from the image pickup element, only a limited area including the selected photometry area is read out, so that the period required for image reading-out can be shortened.

Furthermore, according to this embodiment, an exclusive folder is created in the image data recording media as a folder for storing the image data taken through the AE calibration image-taking, so that the image data is prevented from being mistaken for image data obtained through normal image-taking.

Furthermore, according to this embodiment, since the image data obtained through the AE calibration image-taking is deleted after determination and storing of the AE correction amount, the memory capacity of the image data recording media can be efficiently used.

Furthermore, according to this embodiment, since the AE correction amount is recorded on a storage element provided in the camera by being associated with the lens ID information and the selected photometry area, the AE correction amount can be set for each of a plurality of image-taking lenses and for each photometry area in normal image-taking.

In addition, the AE correction amount is recorded on a storage element provided on the image-taking lens side by being associated with the camera ID information and the selected photometry area, whereby the AE correction amount can be set for each of a plurality of cameras and for each photometry area in normal image-taking.

Embodiment 3

Embodiment 3 of the invention is described with reference to FIG. 1, FIG. 6, FIG. 15A, and FIG. 15B through FIG. 18. The structure of the electronic camera in this embodiment is the same as in Embodiment 1, so that common components are attached with the same symbol as in Embodiment 1 in place of description. This embodiment relates to auto white balance adjustment.

Figure 18:
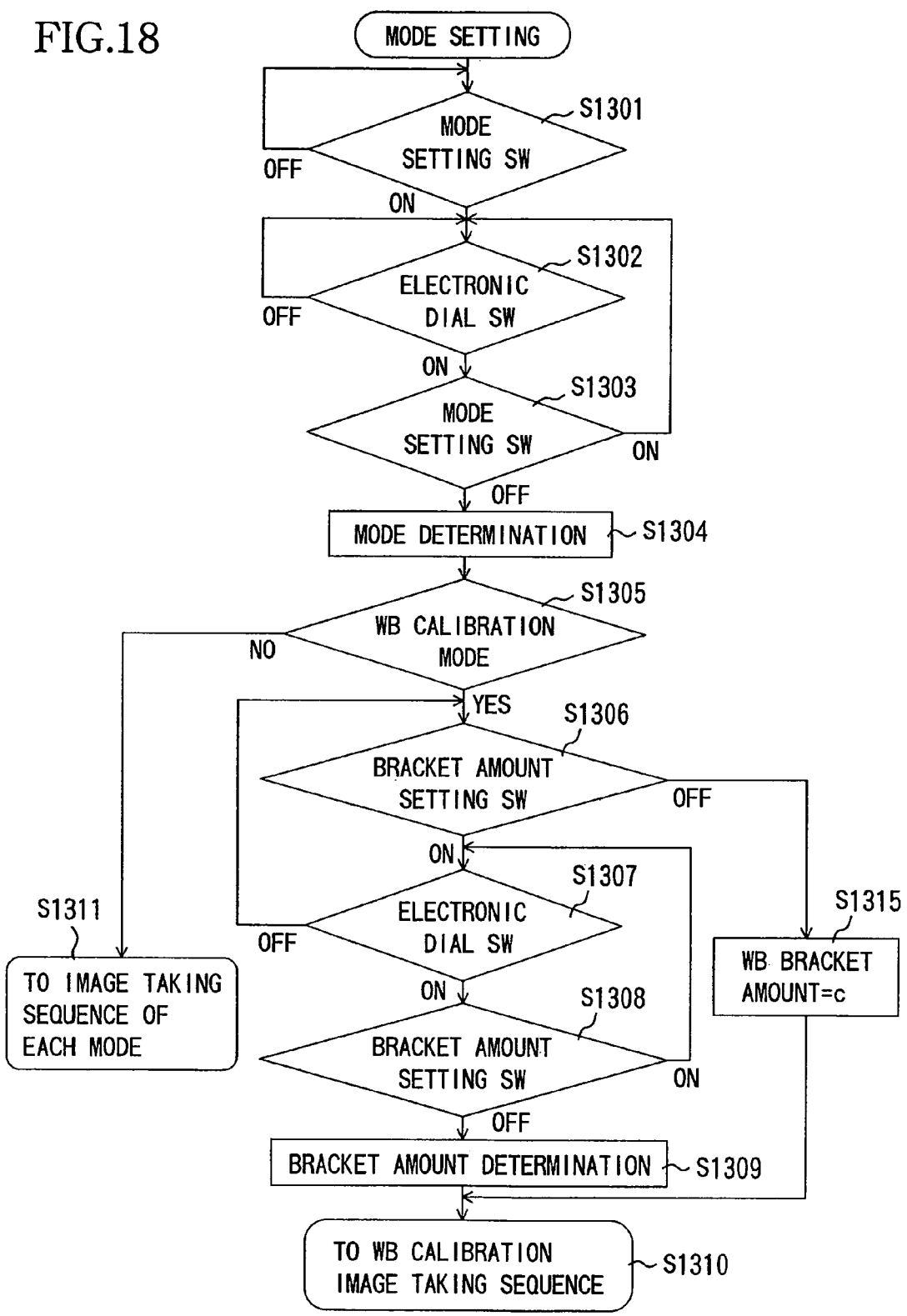
FIG. 18 shows a flowchart of a mode setting sequence to be performed in the electronic camera of Embodiment 3.

The image-taking mode setting sequence is described with reference to FIG. 18. In Step S1301, the system controller 223 determines whether or not the mode setting switch 229 has been turned ON. When it is ON, it is determined that a mode setting operation has been started by a user and the process advances to Step S1302.

In Step S1302, the number of operating clicks of the electronic dial switch 226 is detected. When an electronic dial that turns the electronic dial switch 226 ON and OFF is rotated in a certain direction, by each operating click, the image-taking mode can be changed cyclically to "TV priority mode", "AV priority mode", "Program mode", "White balance (hereinafter, referred to WB also) calibration mode", "TV priority mode" . . . in sequence. Furthermore, when the electronic dial is rotated in reverse, by each operating click, the image-taking mode can be changed cyclically to "TV priority mode", "WB calibration mode", "program mode", "AV priority mode", "TV priority mode" . . . in sequence.

In Step S1303, it is determined whether or not the mode setting switch 229 has been turned OFF. When it is OFF, the image-taking mode selected at this point is set in Step S1304.

Next, in Step S1305, it is determined whether or not the set image-taking mode is the WB calibration mode. When it is a mode other than the WB calibration mode, that is, when it is the TV priority mode, AV priority mode, or Program mode (each mode is a second mode), the process advances to Step S1311 and an image-taking sequence that is not shown and corresponds to each image-taking mode is executed. When it is the WB calibration mode, the process advances to Step S1306.

In Step S1306, it is determined whether or not the bracket amount setting switch 232 has been turned ON. When it is ON, the process advances to Step S1307. When it is not ON, the process advances to Step S1315.

Herein, in bracket image-taking for WB calibration (hereinafter, referred to as WB calibration image-taking), the color temperature (parameter relating to the image-taking) is changed in sequence. In Step S1315, a WB bracket amount indicating the amount of change (correction amount) in color temperature is set to an adjusted value obtained through adjustment during manufacturing, and the process advances to Step S1310 and the WB calibration image-taking sequence is executed. This adjusted value becomes a reference value of the color temperature that is changed in sequence in the WB calibration image-taking sequence.

Namely, when the reference image is taken in the WB calibration image-taking sequence, an actual color temperature is calculated on the basis of the value of the color temperature that has been originally set as a fixed value and adjusted value. When images other than the reference image are taken, image-taking is carried out while shifting the WB bracket amount with respect to the adjusted value (reference value) by each WB bracket stepping amount described later.

In Step S1307, the number of operating clicks of the electronic dial switch 226 is detected. When an electronic dial that turns the electronic dial switch 226 ON and OFF is rotated in an arbitrary direction, with respect to a stepping amount reference set value "c" described later, the WB bracket stepping amount (predetermined amount) indicating the amount of change in WB bracket amount can be changed by each operating click to "reference set value c×0.25", "reference set value c×0.5", "reference set value c", "reference set value c×2" and "reference set value c×4" in sequence. When the electronic dial is rotated in reverse, the WB bracket stepping amount can be changed in reverse of the abovementioned sequence.

However, "reference set value c×0.25" and "reference set value c×4" are the upper and lower limits of the WB bracket stepping amount, and even when the electronic dial is operated so as to exceed these, this operation is ignored.

The relationship of the adjusted value (reference value), the WB bracket amount and the WB bracket stepping amount is the same as in the AF calibration shown in FIG. 19. The stepping amount reference set value "c" is 100K (Kelvin).

In Step S1308, it is determined whether or not the bracket amount setting switch 232 has been turned OFF. When it is OFF, the process advances to Step S1309 and the bracket stepping amount selected at this point is set as the bracket stepping amount "C". Then, the process advances to Step S1310 and the WB calibration image-taking sequence is executed.

Figure 15A:
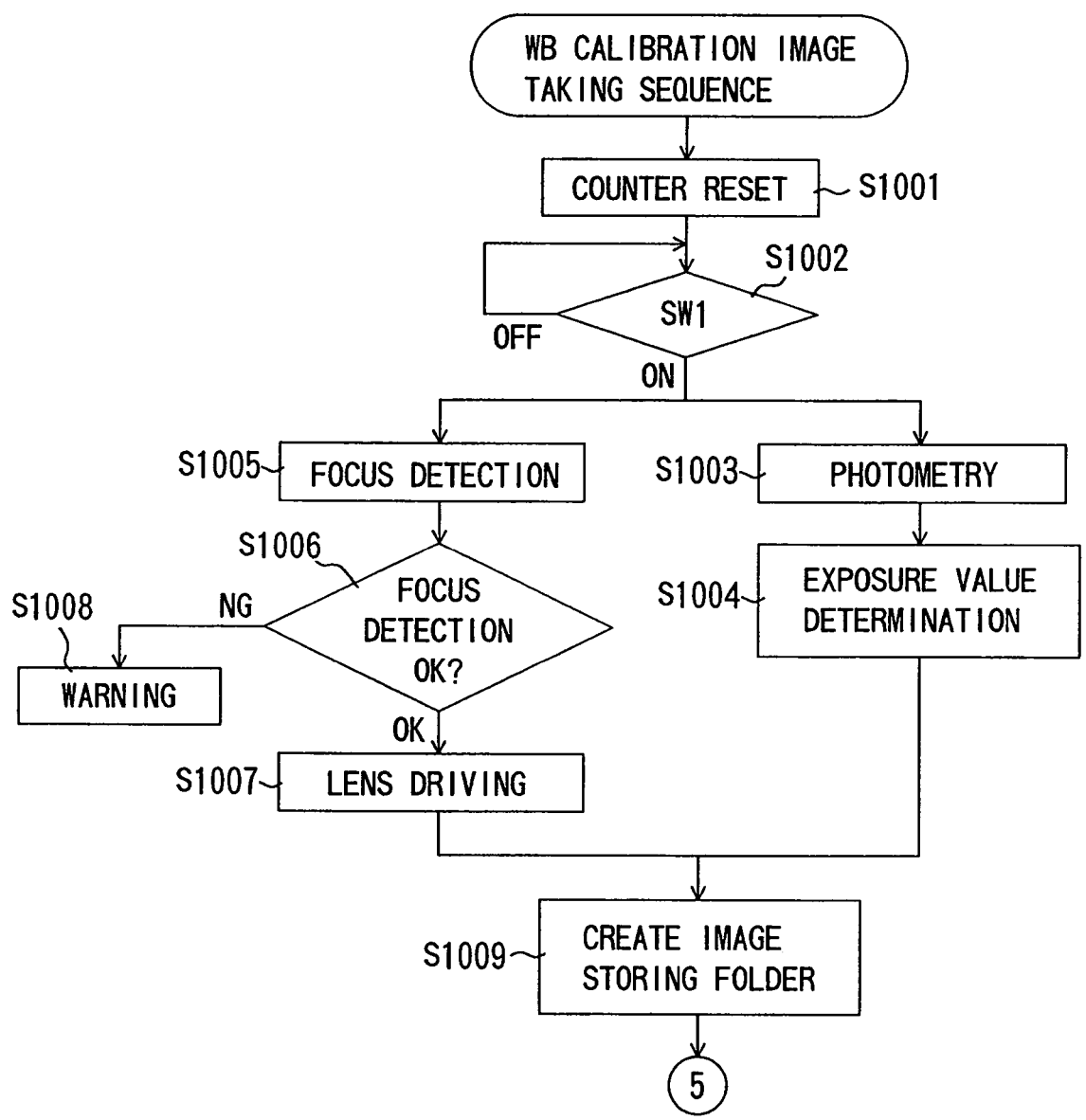
FIG. 15A and FIG. 15B show flowcharts of a WB calibration image-taking sequence to be performed in an electronic camera of Embodiment 3 of the invention.
Figure 15B:
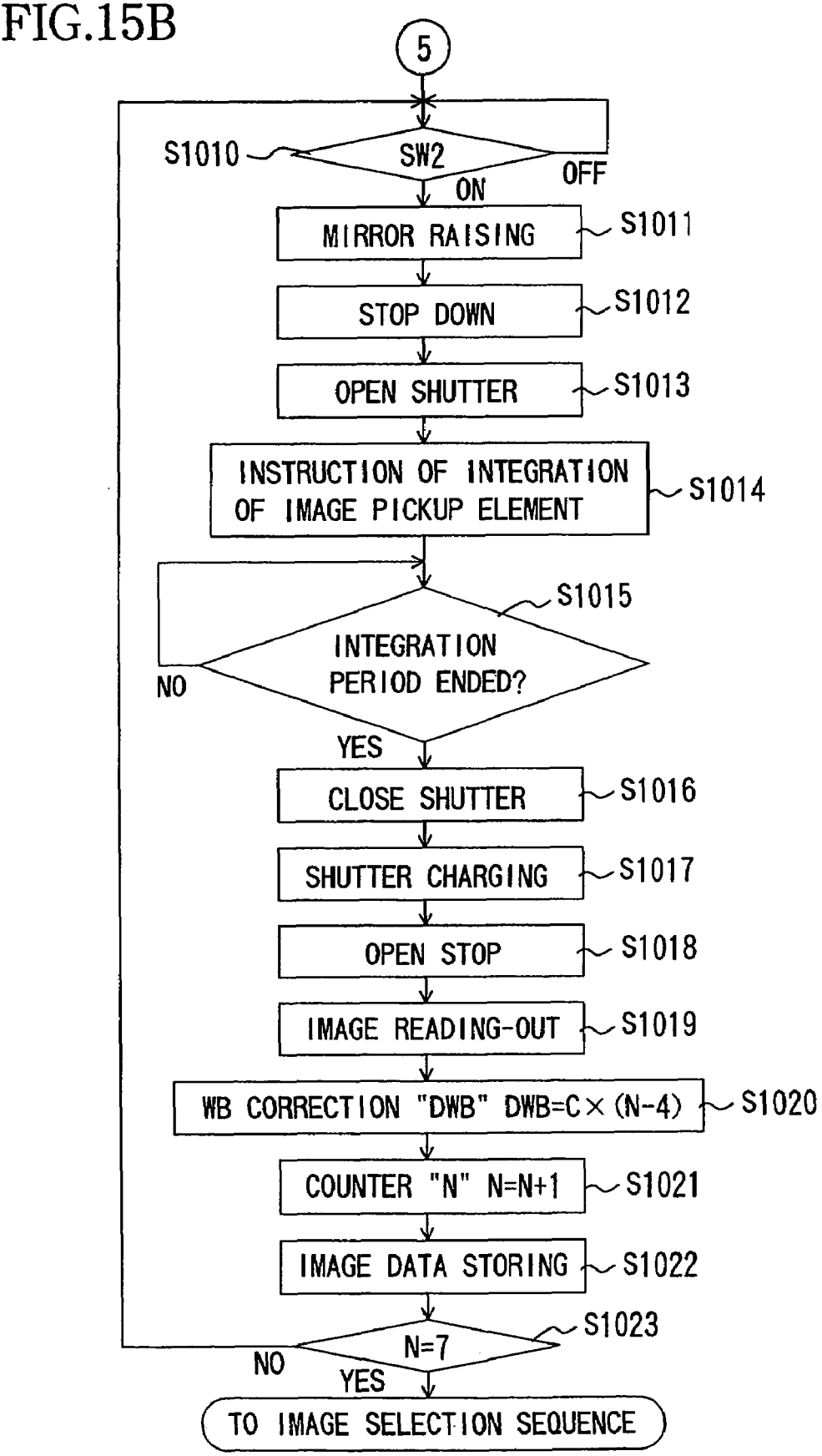

Next, the WB calibration image-taking sequence is described with reference to FIG. 15A and FIG. 15B. In Step S1001, the system controller 223 resets the counter 233.

Next, in Step S1002, it is determined whether or not the release switch SW1 (231) has been turned ON. When it is ON, the process is branched and advances to Step S1003 in which an exposure value is determined and Step S1005 in which focus detection is carried out.

In Step S1003, the photometry circuit 207 performs photometry operation by using a light flux that passed through the image-taking lens 100, and was reflected by the quick return mirror 202 and passed through the pentaprism 201. In Step S1004, an exposure value (an f-number and a charge accumulation (integration) period of the image pickup element 210) is determined on the basis of the results of photometry.

In Step S1005, the system controller 223 carries out focus detection by using the AF sensor 204 and the focus detection circuit 205.

In Step S1006, it is determined whether or not focus detection could be carried out. Focus detection cannot be carried out in some cases where the object as a target of the focus detection is low in contrast or dark, so that in the case where focus detection could not carried out, the process advances to Step S1008 and a warning (indication on the image display circuit 213 and production of a beep sound from the buzzer 234) is issued. When the focus detection could be carried out, the process advances to Step S1007.

In Step S1007, on the basis of the results of focus detection obtained in Step S1005, a lens driving amount is transmitted to the lens control circuit 104. The lens control circuit 104 controls the lens driving mechanism 103 on the basis of the received lens driving amount to drive the focusing lens 101 to an in-focus position.

Then, in Step S1009, to the image data controller 220, the system controller 223 outputs an instruction to create a folder which stores image data taken through the WB calibration image-taking (hereinafter, referred to as WB calibration image data) in the image data recording media 218. The image data controller 220 creates a folder for storing WB calibration image data in the image data recording media 218 via the image compression circuit 219.

In Step S1010, it is determined whether or not the release switch SW2 (230) has been turned ON. When it is ON, the process advances to Step S1011.

In Step S1011, the shutter charge and mirror drive mechanism 211 is controlled to rise the quick return mirror 202.

Next in Step S1012, information on the f-number set in Step S1004 is transmitted to the stop control circuit 106. The stop control circuit 106 controls the stop drive mechanism 105 to stop the stop 102 down to the set f-number.

Next, in Step S1013, the system controller 223 controls the focal plane shutter 208 to open. Furthermore, in Step S1014, the instruction to carry out a charge accumulation operation (integration operation) of the image pickup element 210 is given to the image data controller 220 (DSP). In Step S1015, the process waits for the integration period determined in Step S1004. When the integration period elapses, the process advances to Step S1016 and controls the focal plane shutter 208 is controlled to close.

Next, in Step S1017, charge-driving of the focal plane shutter 208 and lower-driving of the quick return mirror 202 are carried out for the preparation of the next operation.

Next, in Step S1018, the stop 102 is driven to open.

Furthermore, in Step S1019, the image data controller 220 is instructed to take-in image data from the image pickup element 210.

Next, in Step S1020, a WB correction amount "DWB" is calculated. The WB correction amount is added to the correction when auto white balance adjustment is carried out. The system controller 223 receives the current count number "N" from the counter 233, and calculates the exposure correction amount "DWB" by using the following expression.

$$DWB=C\times(N-4)$$

Herein, "4" of (N−4) is the central value of 7 that is the number of setting times of WB calibration image-taking in this embodiment. Therefore, in the WB calibration image-taking of this embodiment, an image taken when WB=C×(4−4), that is, an image taken at a color temperature of a reference value, three images taken when the WB correction amount "DWB" is negative with respect to the reference value, and three images taken when the WB correction amount "DWB" is positive with respect to the reference value are obtained.

In Step S1021, the counter "N" is incremented by one.

Next, in Step S1022, the current WB correction amount "DWB" is transmitted to the image data controller 220 and recording of image data on the image data recording media 218 is instructed to the image data controller 220. The image data controller 220 records the lens ID information obtained by initial communications when the lens was attached, the image data, and the WB correction amount "DWB" on the image data recording media 218 via the image compression circuit 219 by associating these with each other.

Next, In Step S1023, the value of the counter "N" is confirmed. When the counter value does not reach a predetermined value (herein 7, however, other values are possible) indicating the maximum number of times of WB calibration image-taking, the process returns to Step S1010 and the WB calibration image-taking is repeated according to the operation of the release switch SW2 (230) of the user. At this time, the value of the WB correction amount "DWB" changes by each WB bracket stepping amount "C". Therefore, a plurality of images with WB correction amounts "DWB" (that is, color temperatures as a parameter relating to WB) different from each other are taken. On the other hand, when the counter value reaches the predetermined value, it is determined that the WB calibration image-taking sequence has been completed, and the process advances to the WB calibration image selection sequence.

Figure 16:
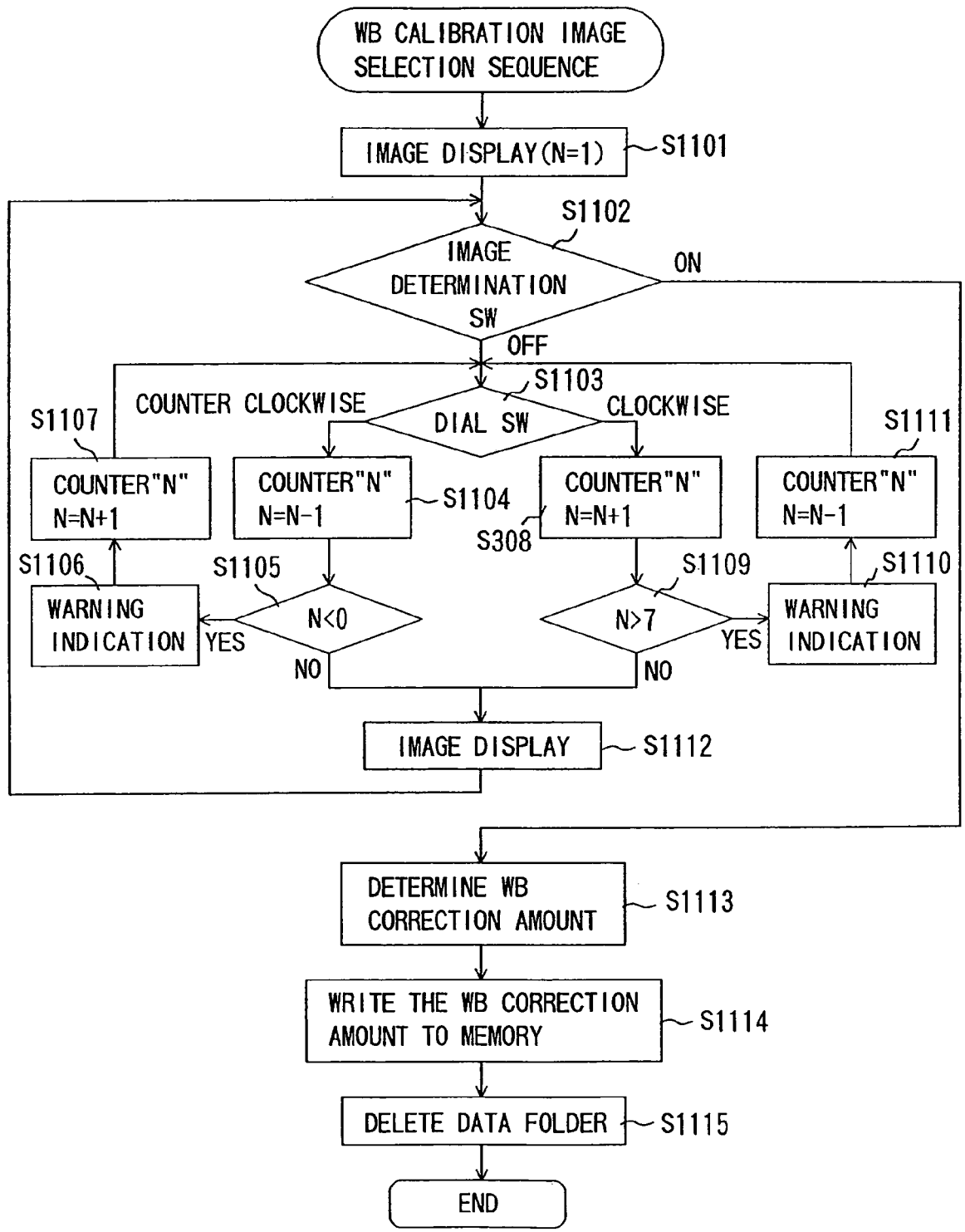
FIG. 16 shows a flowchart of a WB calibration image selection sequence to be performed in the electronic camera of Embodiment 2.

Next, the WB calibration image selection sequence is described with reference to FIG. 16. In Step S1101, the system controller 223 makes the image data controller 220 display image data which corresponds to the counter "1" and is taken through the WB calibration image-taking sequence on the image display circuit 213.

In Step S1102, it is determined whether or not the image determination switch 227 has been turned ON. When it is ON, the process advances to Step S1113. When it is not ON, the process advances to Step S1103.

In Step S1103, the operation state of the electronic dial switch 226 is detected. When the electronic dial is rotated counterclockwise, the process advances to Step S1104, and when it is rotated clockwise, the process advances to Step S1108.

In Step S1104, the counter "N" is decremented by one. In Step S1105, it is determined whether or not the counter "N" has become "O". When "N" is smaller than "O", in Step S1106, a warning, which no WB calibration image data that can be selected and displayed exists, is issued by using the image display circuit 213 or by simultaneously using the image display circuit 213 and the buzzer 234, and the counter "N" is incremented by one in Step S1107. In Step S1105, when it is determined that the counter "N" is larger than "O", the process advances to Step S1112.

On the other hand, in Step S1108, the counter "N" is incremented by one. In Step S1109, it is determined whether or not the counter "N" has become larger than "7". When "N" is larger than "7", in Step S1110, a warning, which no WB calibration image data that can be selected and displayed exists, is issued by using the image display circuit 213 or by simultaneously using the image display circuit 213 and the buzzer 234, and the counter "N" is decremented by one in Step S1111. When it is determined in Step S1109 that the counter "N" is equal to or smaller than "7", the process advances to Step S1112.

In Step S1112, WB calibration image data corresponding to the counter "N" changed in response to the operation of the electronic dial switch 226 is read out from the image data recording media 218 and displayed on the image display circuit 213.

Next, in Step S1113, the WB correction amount "DWB" that has been recorded on the image data recording media 218 by being associated with the WB calibration image data when the image determination switch 227 was turned ON in Step S1102 is determined as a WB correction amount (WB calibration data).

Then, in Step S1114, this WB correction amount "DWB" is written to the EEPROM 222 as a WB correction amount together with the lens ID information.

Next, in Step S1115, all the WB calibration image data and the WB calibration image data folder are deleted from the image data recording media 218.

Figure 17A:
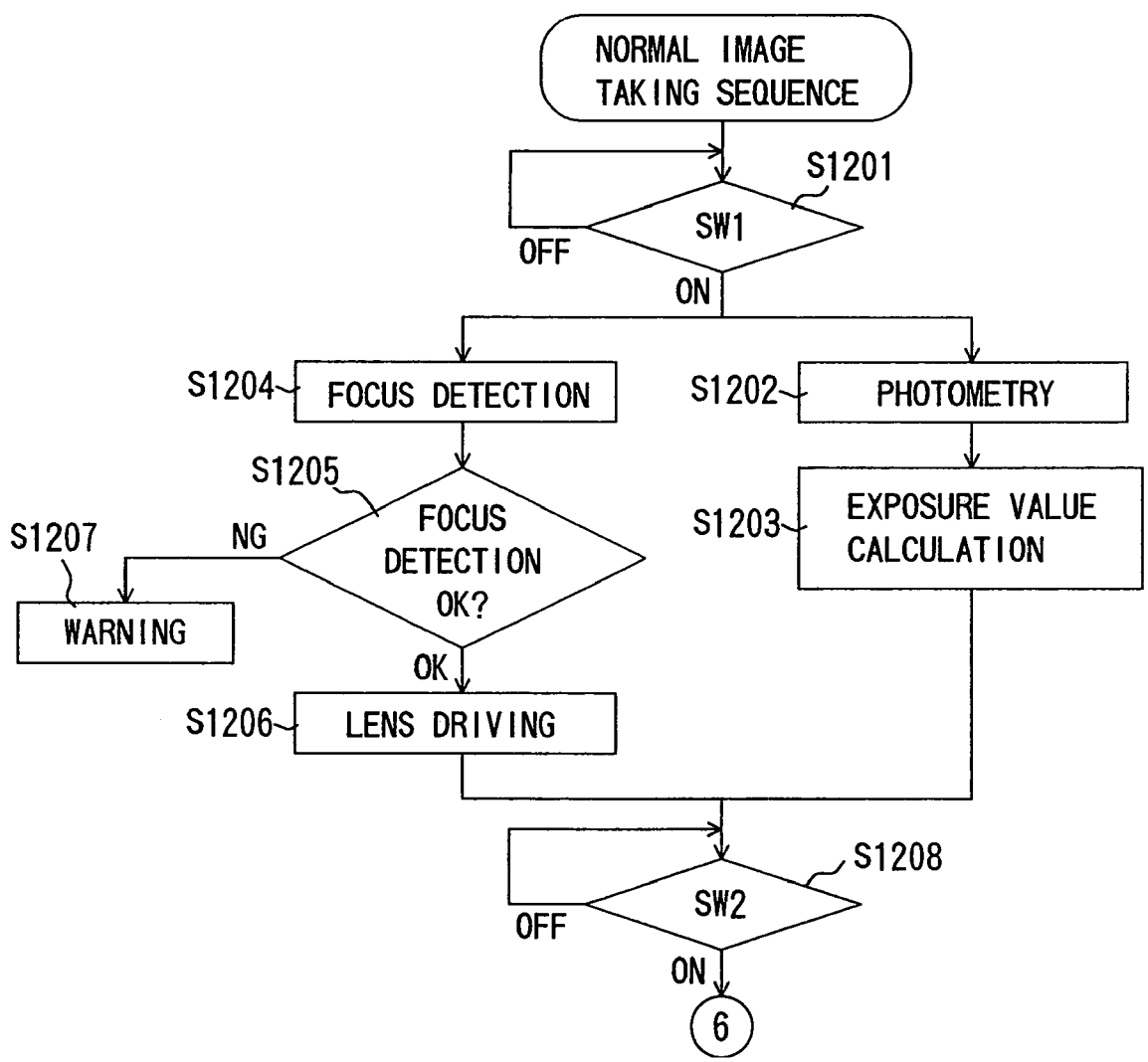
FIG. 17A and FIG. 17B show flowcharts of a normal image-taking sequence to be performed in the electronic camera of Embodiment 3.
Figure 17B:
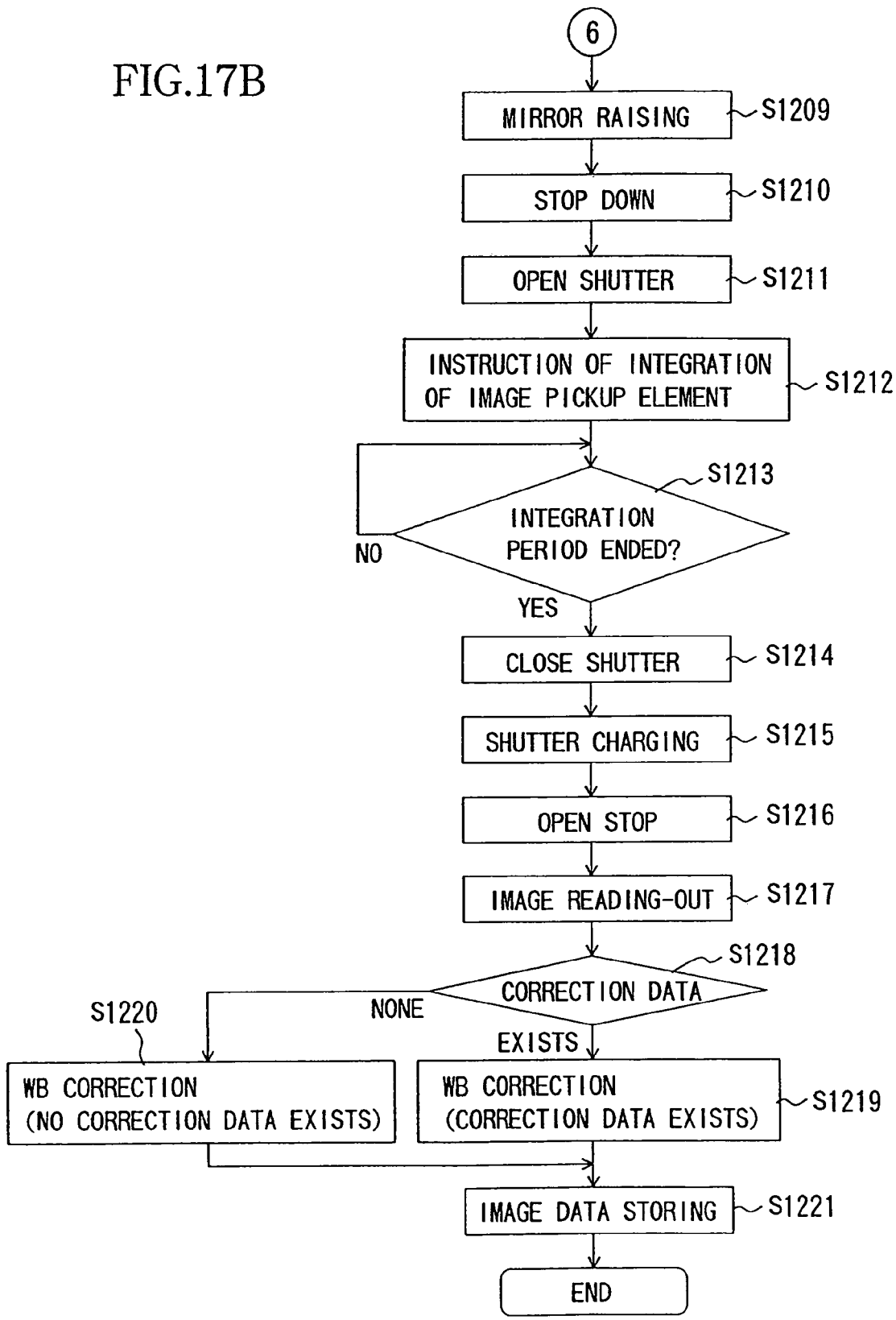

Next, the normal image-taking sequence is described with reference to FIG. 17A and FIG. 17B. In Step S1201, the system controller 223 determines whether or not the release switch SW1 (231) has been turned ON. When it is ON, the process is branched and advances to S1202 in which an exposure value is determined and Step S1204 in which focus detection is carried out.

In Step S1202, the photometry circuit 207 performs photometry operation by using a light flux that passed through the image-taking lens 100, and was reflected by the quick return mirror 202 and passed through the pentaprism 201. In Step S1203, an exposure value (an f-number and a charge accumulation (integration) period of the image pickup element 210) is calculated according to the output of the photometry circuit 207.

Next, in Step S1204, focus detection is carried out by using the AF sensor 204 and the focus detection circuit 205.

In S1205, it is determined whether or not focus detection could be carried out. When focus detection could not be carried out, the process advances to Step S1207 and a warning (indication on the image display circuit 213 and production of a beep sound from the buzzer 234) is issued. When focus detection could be carried out, the process advances to Step S1206.

In Step S1206, the driving of the focusing lens 101 is controlled on the basis of the results of focus detection.

Next, in Step S1208, it is determined whether or not the release switch SW2 (230) has been turned ON. When it is ON, the process advances to Step S1209.

In Step S1209, the system controller 223 controls the shutter charge and mirror drive mechanism 211 to rise the quick return mirror 202.

In Step S1210, information on an f-number set in Step S1203 is transmitted to the stop control circuit 106. The stop control circuit 106 controls the stop drive mechanism 105 to stop the stop 102 down to the set f-number.

Next, in Step S1211, the focal plane shutter 208 is controlled to open. Furthermore, in Step S1212, the image data controller 220 (DSP) is instructed to carry out a charge accumulation operation (integration operation) of the image pickup element 210. In Step S1213, the process waits for the integration period determined in Step S1203. Then, when the integration period elapses, the process advances to Step S1214 and controls the focal plane shutter 208 is controlled to close.

Next, in Step S1215, charge-driving of the focal plane shutter 208 and lower-driving of the quick return mirror 202 are carried out for preparation of the next operation.

Next, in Step S1216, the stop 102 is driven to open. Furthermore, in Step S1217, the image data controller 220 is instructed to take-in image data from the image pickup element 210.

Next, in Step S1218, the lens ID information stored in the EEPROM 222 is read out and it is determined whether or not the WB correction amount (WB calibration data) corresponding to the image-taking lens (identified according to the lens ID information) attached to the electronic camera 200 has been stored in the EEPROM 222. When it is stored, the process advances to Step S1219, and otherwise the process advances to Step S1220.

In Step S1219, WB correction is carried out. The WB correction herein is carried out by using the normal WB correction (WB correction by using the originally set color temperature and adjusted value "c") and WB correction amount (WB calibration data). On the other hand, in Step S1220, normal WB correction is carried out.

Next, in Step S1221, the image data subjected to WB correction is recorded on the image data recording media 218 through the image compression circuit 219. Then, this flow is ended.

Furthermore, in this embodiment, a folder for WB calibration image data is newly created in the image data recording media 218, and when selection of an WB calibration image is finished and determination and writing of a WB correction amount (WB calibration data) are completed, the image data and folder are both deleted. However, if the memory capacity of the image data recording media 218 allows, these may not be deleted. In this case, the "folder creating operation" in Step S1009 and the operation in Step S1115 become unnecessary.

Furthermore, in this embodiment, the WB correction amount is stored in the EEPROM 222 provided in the electronic camera 200 by being associated with the lens ID information. However, in a case where a storage element (such as a memory which the lens control circuit 104 has) is provided in the image-taking lens 100, it is also possible that the WB correction amount is stored in this storage element by being associated with the camera ID information as identification information unique to the electronic camera 200.

Furthermore, in this embodiment, image display is carried out by using the image display circuit 213 provided in the electronic camera 200 when the WB calibration image selection sequence is carried out. However, it is also possible that the image data is transmitted to an external connected apparatus 300 through the communications interface circuit 224 and image display and image selection are executed in the external connected apparatus 300. In this case, image selection information is transmitted to the camera, and the camera determines a WB correction value according to a WB calibration image corresponding to the transmitted image selection information.

Or, in the camera, the WB calibration images are recorded on recording media such as a semiconductor memory, an optical disk, or a magnetic disk, etc., a WB calibration image is read out by external apparatus such as a computer from the recording media, and image selection information selected by a user with the external apparatus is recorded on the recording media. Then, the recording media is re-loaded to the camera, and a WB correction value is determined according to the selected WB calibration image.

Furthermore, in this embodiment, the sequences are controlled by the system controller 223 inside the electronic camera 200, however, it is also possible that the system controller 223 is controlled by the external connected apparatus 300 via the communications interface circuit 224 to execute the sequences.

When an illumination apparatus is attached to the electronic camera 200, it is possible that color temperature information of the emission color is obtained from the illumination apparatus, the reference value of the white balance is changed or the WB bracket stepping amount is changed.

According to this embodiment described above, WB calibration image-taking is carried out a plurality of times while changing the color temperature in white balance, and the taken image data and the amount of change (WB correction amount) in color temperature from the reference value are recorded on the recording media by being associated with each other. Furthermore, after finishing image-taking, an image with white balance that the user regards as optimal is selected from the taken image data, and the color temperature correction amount recorded by being associated with the selected image data is stored as a color temperature correction amount (WB correction amount) of the white balance control. In normal image-taking, auto white balance is carried out by correcting the adjustment amount at the time of manufacturing by using the WB correction amount. Therefore, a taken image that has white balance optimal for the user can be obtained. Furthermore, it is possible for a user to easily select the color temperature setting in the auto white balance.

Furthermore, according to this embodiment, the interval (WB bracket stepping amount) of selection of the color temperature correction amount is changeable, so that a more optimal WB correction amount can be obtained.

Furthermore, according to this embodiment, manufacturing errors of the camera and manufacturing errors of the image-taking lens can be satisfactorily and easily corrected by a user.

Furthermore, according to this embodiment, since an exclusive folder as a folder that stores the image data taken through WB calibration image-taking is created in the image data recording media, the image data is prevented from being mistaken for image data obtained through normal image-taking.

Furthermore, according to this embodiment, the image data taken through WB calibration image-taking is deleted after the WB correction amount is determined and stored, so that the memory capacity of the image data recording media can be efficiently used.

Furthermore, according to this embodiment, since the WB correction amount is recorded on the storage element provided in the camera by being associated with the lens ID information, at the time of normal image-taking, the WB correction amount can be set for each of a plurality of image-taking lenses.

Furthermore, if the WB correction amount is stored in the storage element provided on the image-taking lens side by being associated with the camera ID information, the WB correction amount can be set for each of a plurality of cameras at the time of normal image-taking.

Furthermore, in each of the embodiments described above, amounts of changes in parameters relating to image-taking (amount of defocus, exposure value, and color temperature) from their reference values are stored. However, in the present invention, it is also possible that the changed parameters themselves are stored.

Furthermore, the sequence of image-taking in the calibration image-taking sequence (the sequence of parameter changing) is not limited to that of each embodiment described above, and any sequence is allowed.

Furthermore, in the embodiments described above, a plurality of images are taken by changing the parameter by each predetermined (selected) bracket stepping amount, and an amount of change in parameter corresponding to one image selected by a user from the reference value is stored. However, it is also possible that a user is enabled to select two images and values (for example, averages) between amounts of changes in two parameters corresponding to the two images from the reference value are stored. Thereby, a parameter even more optimal for the user can be selected.

Furthermore, in the embodiments described above, a lens separated type image-taking apparatus in which an image-taking lens is attached to a camera (main body) is described, however, the invention is also applicable to a lens integrated type image-taking apparatus. In this case, the functions of the control circuits 104 and 106 inside the image-taking lens 100 are aggregated to the system controller 223 on the camera side.

As described above, according to the above-mentioned embodiments, a plurality of images having parameters relating to image-taking different from each other are automatically successively taken, and a parameter corresponding to an image selected by a user among the plurality of images is set for subsequent image-taking. Therefore, without making the apparatus structure including the programs complicated, image-taking that the user desired can be carried out regardless of errors in manufacturing and adjustment errors.

Herein, the case where information on a parameter to be stored is set to a parameter corresponding to the selected image or an amount of change in the parameter from a reference value has the following effect in comparison with the case of storing by changing the reference value. Namely, for example, in an interchangeable lens type image-taking apparatus, regardless of an attached lens apparatus, a proper range of change in parameter (not biased to values around the reference value set for a certain lens apparatus) can be set so as to include an original reference value set in the image-taking apparatus main body.

Furthermore, when the parameter is changed by each predetermined amount, the predetermined amount is made selectable by a user, whereby various parameter changing covering minute parameter changing and rough parameter changing is possible at a resolution that a user desires.

Furthermore, by integrally providing a display that displays the plurality of images and a selection section for image selection by a user in the image-taking apparatus, image selection can be made with the image-taking apparatus solely.

Furthermore, the plurality of images and information on parameters corresponding to the respective images are recorded on the recording media by being associated with each other, whereby information on a parameter corresponding to the image by selecting an image can be easily read out without fail.

Furthermore, it is made possible to selectively set a first image-taking mode in which a plurality of images are taken and a second image-taking mode in which image-taking is carried out by using a determined parameter, whereby it can be prevented that a user confuses the image-taking for selection of an image (parameter) with normal image-taking.

Furthermore, the parameter relating to image-taking is set to an amount of defocus of the image-taking optical system, whereby an in-focus state that a user desires can be selected. In this case, when a focusing area in which an in-focus state is obtained is selectable in an image-taking area in focusing control, an enlarged image including a focusing area selected at its center in a taken image is output, or only the image including the selected focusing area at its center in the image-taking area is generated as a taken image, whereby the period required for storing, display, and selection of the plurality of images can be shortened, and confirmation of the in-focus state by a user can be made easy.

Furthermore, the parameter relating to image-taking is set to an exposure value of the image pickup element, whereby an image with brightness that a user desires can be selected. In this case, when selection of a photometry area in which photometry is carried out in the image-taking area is possible, an enlarged image of an area including the selected photometry area at its center in the taken image is outputted, or only the image of the area including the selected photometry area at its center in the image-taking area is generated as a taken image, whereby the period required for storing, display, and selection of the plurality of images can be shortened, and confirmation of the brightness by a user can be made easy.

Furthermore, by setting the parameter relating to image-taking to a color temperature, white balance that a user desires can be selected.

Furthermore, when the abovementioned plurality of images are outputted, image processing different from in the case where an image (preview image) taken by using a determined parameter is outputted is applied. For example, image processing that does not include edge enhance processing and level correction processing that are carried out for a preview image are applied, whereby it becomes easy to confirm the way of image change due to a parameter change.

Furthermore, when this image-taking apparatus includes a lens apparatus and an image-taking apparatus main body to which this lens apparatus is attached, by storing identification information of the lens apparatus or the image-taking apparatus main body and information on parameters in a memory by associating these with each other, even when the combination of the lens apparatus and the image-taking apparatus main body is changed, parameters (parameters that have already been selected by a user) corresponding to the changed combination can be easily and automatically set.

In this invention, information on a parameter to be stored in the memory may be a parameter itself corresponding to the selected image, or an amount of change in the parameter from its reference value. In addition, it is also possible that these are converted into formats suitable for storing in the memory.

Furthermore, when the parameter is successively changed, it can be changed by each predetermined amount.

A "reference value" may be a value to be set changeably according to the results of detection of object conditions, or may be a fixed value. Furthermore, it may be selected among a plurality of fixed values by a user.

Furthermore, the "predetermined value" may be a fixed value, or may be a value selected by a user.

Furthermore, as the display, a display integrally provided on the camera or a monitor of a personal computer can be used.

While preferred embodiments have been described, it is to be understood that modification and variation of the present invention may be made without departing from the scope of the following claims.

This application claims priority from Japanese Patent Application No. 2003-337071 filed on Sep. 29, 2003, which is hereby incorporated by reference herein.

What is claimed is:

1. An image-taking apparatus comprising:
   an image pickup element which photoelectrically converts an object image;
   an image-taking section which carries out image-taking by using the image pickup element;
   a first control section which, in a calibration mode, successively shifts a parameter relating to image-taking so as to include a reference value adjusted during manufacturing of the image-taking apparatus and makes the image-taking section take a plurality of images with parameters different from each other;
   a second control section which, in the calibration mode, stores a correction amount relating to the parameter corresponding to an image selected by a user among the plurality of images in a memory; and
   a third control section which, in a normal image-taking mode, corrects the parameter to be used for a normal image-taking on the basis of the correction amount stored in the memory and the reference value,
   wherein the parameter is an amount of defocus of an image-taking optical system which forms the object image, and
   the reference value is an amount of defocus corresponding to an in-focus state in focusing control of the image-taking optical system.

2. The image-taking apparatus according to claim 1, wherein selection of a focusing area where an in-focus state is obtained in an image-taking area is possible in the focusing control, and
   the image-taking section outputs an enlarged image of an area including the selected focusing area at its center in the image taken.

3. The image-taking apparatus according to claim 1, wherein selection of a focusing area where an in-focus state is obtained in an image-taking area is possible in the focusing control, and the first control section makes the image-taking section generate only an image of an area including the selected focusing area at its center in the image-taking area as a taken image.

4. An image-taking apparatus comprising:

an image pickup element which photoelectrically converts an object image;

an image-taking section which carries out image-taking by using the image pickup element;

a first control section which, in a calibration mode, successively shifts a parameter relating to image-taking so as to include a reference value adjusted during manufacturing of the image-taking apparatus and makes the image-taking section take a plurality of images with parameters different from each other;

a second control section which, in the calibration mode, stores a correction amount relating to the parameter corresponding to an image selected by a user among the plurality of images in a memory; and a third control section which, in a normal image-taking mode, corrects the parameter to be used for a normal image-taking on the basis of the correction amount stored in the memory and the reference value, wherein a lens apparatus can be attached, and the second control section determines identification information unique to the attached lens apparatus, and stores the identification information as being associated with the correction amount relating to the parameter in the memory.

5. An image-taking apparatus comprising:

an image pickup element which photoelectrically converts an object image;

an image-taking section which carries out image-taking by using the image pickup element;

a first control section which, in a calibration mode, successively shifts a parameter relating to image-taking so as to include a reference value adjusted during manufacturing of the image-taking apparatus and makes the image-taking section take a plurality of images with parameters different from each other;

a second control section which, in the calibration mode, stores a correction amount relating to the parameter corresponding to an image selected by a user among the plurality of images in a memory; and a third control section which, in a normal image-taking mode, corrects the parameter to be used for a normal image-taking on the basis of the correction amount stored in the memory and the reference value, a lens apparatus; and a main body of the image-taking apparatus to which the lens apparatus is attached, wherein the second control section stores identification information unique to the main body as being associated with the correction amount relating to the parameter in the memory provided in the lens apparatus.

* * * * *